(12) United States Patent
Tamaki et al.

(10) Patent No.: US 9,971,190 B2
(45) Date of Patent: May 15, 2018

(54) DISPLAY DEVICE AND ELECTRONIC APPARATUS

(71) Applicant: Japan Display Inc., Tokyo (JP)

(72) Inventors: Masaya Tamaki, Tokyo (JP); Yoko Fukunaga, Tokyo (JP); Masashi Mitsui, Tokyo (JP); Susumu Kimura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days. days.

(21) Appl. No.: 15/096,462

(22) Filed: Apr. 12, 2016

(65) Prior Publication Data

US 2016/0223861 A1    Aug. 4, 2016

Related U.S. Application Data

(63) Continuation of application No. 14/221,893, filed on Mar. 21, 2014, now Pat. No. 9,335,580.

(30) Foreign Application Priority Data

Apr. 8, 2013 (JP) ................................ 2013-080767

(51) Int. Cl.
*G02F 1/1335* (2006.01)
*G02F 1/1339* (2006.01)
*G02F 1/1343* (2006.01)

(52) U.S. Cl.
CPC .... *G02F 1/133514* (2013.01); *G02F 1/13394* (2013.01); *G02F 1/133504* (2013.01);
(Continued)

(58) Field of Classification Search
CPC .............................................. G02F 1/133514
See application file for complete search history.

(56) References Cited

U.S. PATENT DOCUMENTS 6,424,395 B1    7/2002    Sato et al.
6,933,994 B1    8/2005    Kaneko et al.
(Continued)

FOREIGN PATENT DOCUMENTS

JP    2003-255316    9/2003
JP    2004-102305    4/2004
(Continued)

OTHER PUBLICATIONS

Office Action received in JP Application 2013-080767, dated Jan. 19, 2016 (12 pages).

*Primary Examiner* — Wen-Ying P Chen
(74) *Attorney, Agent, or Firm* — K&L Gates LLP

(57) ABSTRACT

According to an aspect, a display device includes: a display surface on which pixels each including sub-pixels of a plurality of colors are two-dimensionally arrayed; a reflective member; a first substrate provided with the reflective member; a second substrate arranged to face the first substrate; a color filter provided with filters of at least two colors corresponding to the sub-pixels; and a scattering member provided on the second substrate. A main viewing angle direction of the display device is a direction intersecting with the display surface. The color filter is formed such that a change in transmittance of the filters per pixel in the main viewing angle direction is smaller than a change in transmittance of the filters per pixel in a direction orthogonal to the main viewing angle direction in a direction parallel to the display surface.

6 Claims, 37 Drawing Sheets

(52) U.S. Cl.
CPC .. *G02F 1/133512* (2013.01); *G02F 1/133553* (2013.01); *G02F 1/134336* (2013.01); *G02F 1/133524* (2013.01); *G02F 2001/133616* (2013.01); *G02F 2001/134345* (2013.01); *G02F 2201/52* (2013.01)

(56) References Cited

U.S. PATENT DOCUMENTS

| | | | |
|---|---|---|---|
| 2003/0103177 A1 | 6/2003 | Maeda et al. | |
| 2005/0068281 A1* | 3/2005 | Shin | G02F 1/134336 345/88 |
| 2005/0270444 A1* | 12/2005 | Miller | G09G 3/3216 349/108 |
| 2006/0268203 A1* | 11/2006 | Kurahashi | G02F 1/1347 349/108 |
| 2006/0274235 A1 | 12/2006 | Takizawa | |
| 2007/0109469 A1 | 5/2007 | Jeon et al. | |
| 2010/0134728 A1* | 6/2010 | Kim | G02F 1/134363 349/106 |
| 2012/0250158 A1 | 10/2012 | Tamaki et al. | |

FOREIGN PATENT DOCUMENTS

| | | |
|---|---|---|
| JP | 2012-189625 | 10/2012 |
| JP | 2012-208408 | 10/2012 |
| WO | 01/38932 | 5/2001 |

\* cited by examiner

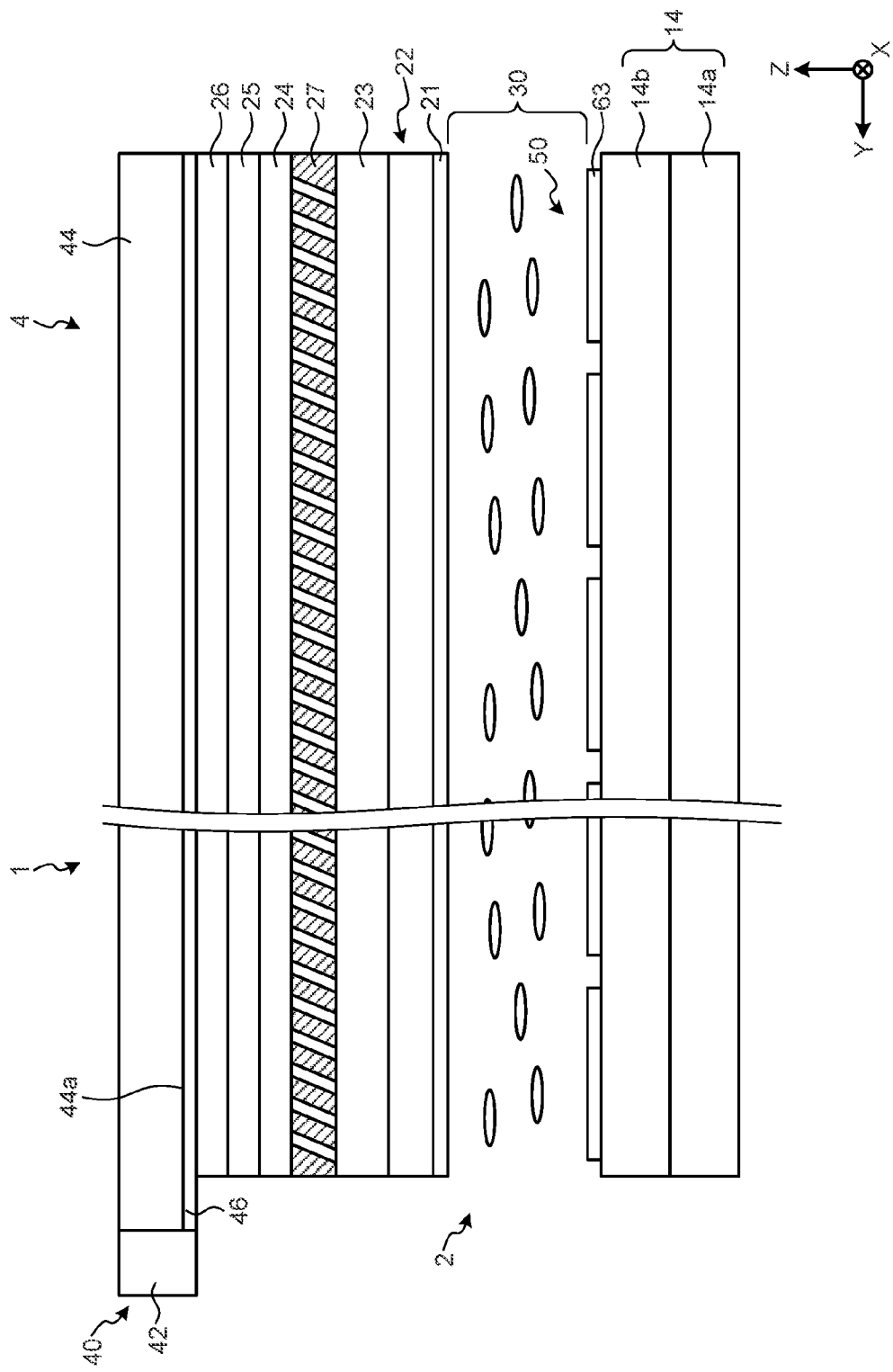

FIG.12B
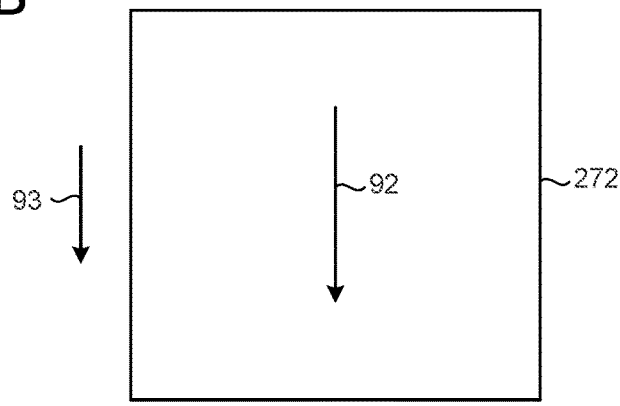
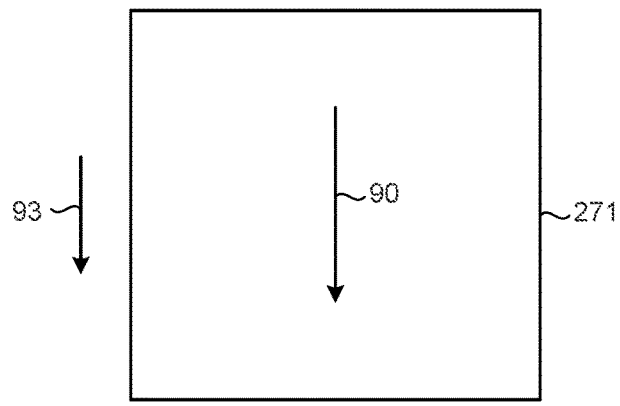
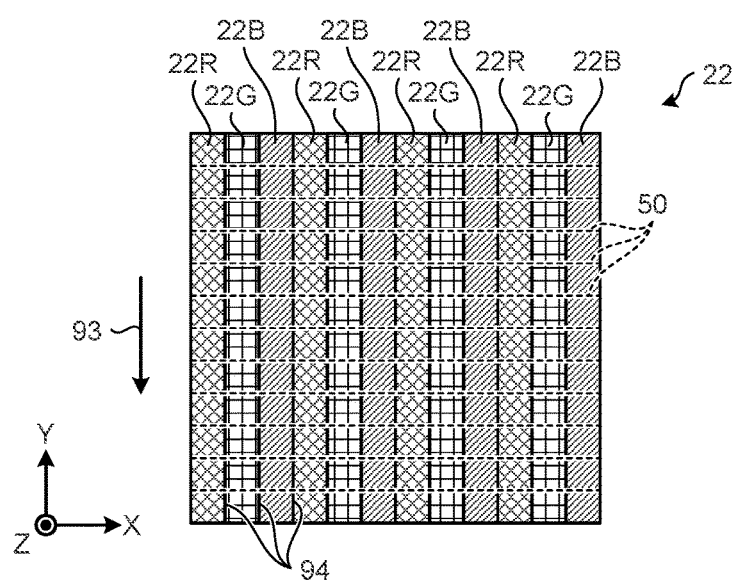

DISPLAY DEVICE AND ELECTRONIC APPARATUS

CROSS REFERENCES TO RELATED APPLICATIONS

The present application is a continuation of U.S. application Ser. No. 14/221,893, filed Mar. 21, 2014, which claims priority to Japanese Priority Patent Application JP 2013-080767 filed in the Japan Patent Office on Apr. 8, 2013, the entire content of which is hereby incorporated by reference.

BACKGROUND

1. Technical Field

The present disclosure relates to a display device and an electronic apparatus including the same.

2. Description of the Related Art

Display devices include transmissive display devices that perform display using transmitted light of backlight output from the back surface of a screen and reflective display devices that perform display using reflected light of external light. The reflective display devices have characteristics such as requiring less power consumption and providing a screen easy to see under a bright environment. Display devices also include transflective display devices having the characteristics of both transmissive display devices and reflective display devices. The transflective display devices perform display using transmitted light of backlight under a dark environment and perform display using reflected light of external light under a bright environment.

In display devices disclosed in Japanese Patent Application Laid-open Publication No. 2004-102305, for example, an anisotropic scattering film capable of increasing light reflectance, such as a light control film (LCF), is arranged on the observation surface side of a displaying device to increase the illuminance of an image. The anisotropic scattering film has a scattering central axis. The scattering central axis extends in a direction inclined with respect to the normal direction of the observation surface of the displaying device at a certain angle. Light passing through the anisotropic scattering film along the scattering central axis is converted into scattered light. To improve the viewing angle characteristics (viewing angle dependence) of the displaying device, the scattering central axis extends in an azimuth substantially coincident with an azimuth in which the contrast ratio of the displaying device is the maximum.

If a scattering member, such as an anisotropic scattering film, is arranged on an output surface from which reflected light is output in a reflective display device or a transflective display device that performs display using reflected light of external light, the reflected light output from the output surface passes through the scattering member. In this case, passing through the scattering member may possibly cause the light to spread out in the surface, thereby blurring an image.

For the foregoing reasons, there is a need for a display device capable of reducing a blur in an image and an electronic apparatus including the same.

SUMMARY

According to an aspect, a display device includes: a display surface on which pixels each including sub-pixels of a plurality of colors are two-dimensionally arrayed; a reflective member; a first substrate provided with the reflective member; a second substrate arranged to face the first substrate; a color filter provided with filters of at least two colors corresponding to the sub-pixels; and a scattering member provided on the second substrate. A main viewing angle direction of the display device is a direction intersecting with the display surface. The color filter is formed such that a change in transmittance of the filters per pixel in the main viewing angle direction is smaller than a change in transmittance of the filters per pixel in a direction orthogonal to the main viewing angle direction in a direction parallel to the display surface.

According to another aspect, an electronic apparatus includes the display device.

Additional features and advantages are described herein, and will be apparent from the following Detailed Description and the figures.

BRIEF DESCRIPTION OF THE FIGURES

FIG. 1A is a sectional view of a schematic configuration of a reflective liquid-crystal display (LCD) device to which the present disclosure is applied;

FIG. 12B is a schematic of a relation of the arrangement of a color filter, the scattering axis directions of the anisotropic scattering member, and the main viewing angle direction of the liquid-crystal panel;

DETAILED DESCRIPTION

Figure 1B:
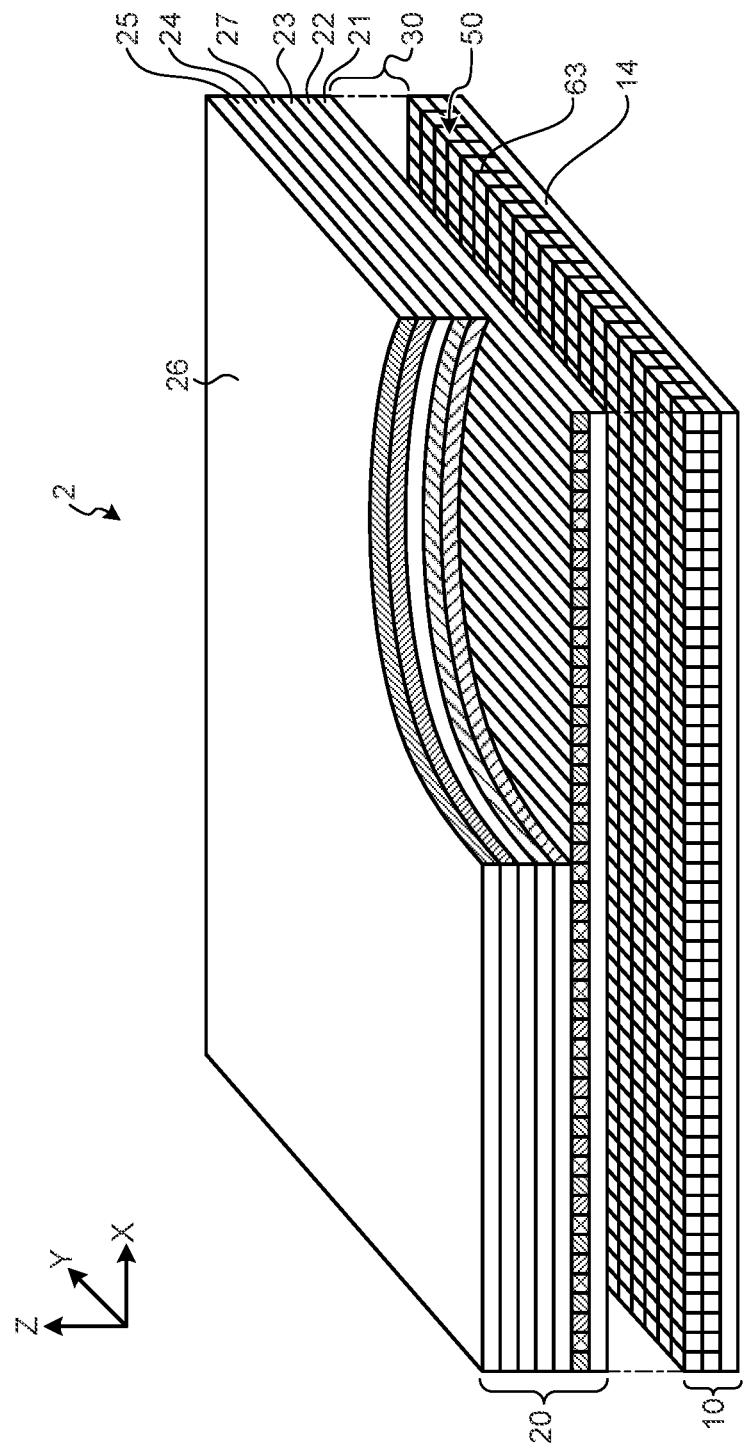
FIG. 1B is a perspective view schematically illustrating a configuration of a reflective LCD panel with a part thereof cut out.

Aspects for embodying technologies according to the present disclosure (hereinafter, referred to as "embodiments") are described below in greater detail with reference to the accompanying drawings in the following order:

1. Display device to which the present disclosure is applied
  1-1. Reflective LCD device supporting color display
  1-2. Basic pixel circuit
  1-3. Pixel and a sub-pixel
  1-4. Electrode structure of a pixel unit
  1-5. Method for driving an LCD panel
  1-6. Anisotropic scattering member
  1-7. Arrangement of a color filter
  1-8. Front light unit
  1-9. Transflective LCD device supporting color display
2. Electronic apparatuses
3. Aspects of the present disclosure 1. Display Device to which the Present Disclosure is Applied The technologies according to the present disclosure are applicable to flat-panel (flat) display devices. Examples of the flat-panel display devices include, but are not limited to, display devices provided with a liquid-crystal display (LCD) panel, display devices provided with an electroluminescence (EL) display panel, display devices provided with a plasma display (PD) panel, etc.

These flat-panel display devices can be classified into transmissive display devices and reflective display devices by their display modes. The technologies according to the present disclosure are applicable to reflective display devices and transflective devices that have the characteristics of both transmissive display devices and reflective display devices. In other words, the technologies according to the present disclosure are applicable to any devices that perform display by reflecting light with reflective electrodes. In the description below, examples will be given in which the technologies according to the present disclosure are applied to a reflective LCD device that provides a screen easy to see under both a bright environment and requires less power consumption, and in which the technologies according to the present disclosure are applied to a transflective LCD device that has a screen easy to see under both a bright environment and a dark environment and requires less power consumption. A reflective LCD device and a transflective LCD device having these characteristics are preferably used as a display unit of electronic apparatuses, specifically, of portable electronic apparatuses frequently used outdoors, that is, portable electronic apparatuses including portable information apparatuses, such as digital cameras, and portable communication apparatuses, such as mobile phones.

The reflective LCD device and the transflective LCD device to which the present disclosure is applied are display devices supporting color display. In the display device supporting color display, one pixel (a unit pixel) serving as a unit that constitutes a color image includes a plurality of sub-pixels. More specifically, in the display device supporting color display, the unit pixel includes three sub-pixels of a sub-pixel that displays red (R), a sub-pixel that displays green (G), and a sub-pixel that displays blue (B), for example.

The unit pixel is not necessarily formed by combining sub-pixels of the three primary colors of RGB. The unit pixel may be formed by adding a sub-pixel of one color or sub-pixels of a plurality of colors to the sub-pixels of the three primary colors of RGB. More specifically, the unit pixel may be formed by adding a sub-pixel that displays white (W) to increase the luminance or adding at least one sub-pixel that displays a complementary color to expand a color extension range, for example.

1-1. Reflective LCD Device Supporting Color Display

The following describes a reflective LCD device supporting color display as an example of the LCD device to which the present disclosure is applied with reference to the accompanying drawings.

FIG. 1A is a sectional view of a schematic configuration of a reflective LCD device to which the present disclosure is applied. FIG. 1B is a perspective view schematically illustrating a configuration of a reflective LCD panel with a part thereof cut out. As illustrated in FIG. 1A, a reflective LCD device 1 includes a reflective LCD panel 2 and a front light unit 4. The front light unit 4 is arranged on the side of a surface that displays an image of the reflective LCD panel 2. In the present embodiment, an X-direction represents a direction in which a light source 40 of the front light unit 4 is arrayed, that is, a longitudinal direction of a side surface of a light guide plate 44 on which light output from the light source 40 is incident. A Y-direction represents a direction in which the light output from the light source 40 is incident. A Z-direction represents a direction in which the reflective LCD panel 2 and the front light unit 4 are layered.

As illustrated in FIG. 1A and FIG. 1B, a reflective LCD panel 2 includes a first panel unit 10, a second panel unit 20, and a liquid-crystal layer 30 as main components. The surface of the second panel unit 20 serves as a display surface of the reflective LCD panel 2. The first panel unit 10 and the second panel unit 20 are arranged in a manner facing each other with a predetermined gap interposed therebetween. By sealing the gap between the first panel unit 10 and the second panel unit 20 with a liquid-crystal material, the liquid-crystal layer 30 is formed.

The first panel unit 10 includes a first substrate 14 and reflective electrodes 63 arranged in this order from the side opposite to the liquid-crystal layer 30. The first substrate 14 is made of a substrate material including transparent glass. The reflective electrodes 63 are formed on the liquid-crystal layer 30 side of the first substrate 14. The reflective electrodes 63 each serve as a part of a sub-pixel 50.

In the first panel unit 10, the first substrate 14 includes a circuit board 14a and a planarizing film 14b layered thereon. The circuit board 14a is provided with a plurality of signal lines and a plurality of scanning lines, to be described later, formed on a glass substrate in a manner intersecting with each other. The sub-pixels (hereinafter, which may be simply referred to as "pixels") 50 are two-dimensionally arranged in a matrix at portions where the signal lines and the scanning lines intersect with each other.

Circuit elements including switching elements and capacitive elements, such as thin film transistors (TFT), are formed on the circuit board 14a for the respective pixels 50. The planarizing film 14b is formed on the surface of the circuit elements, the signal lines, and the scanning lines of the first substrate 14, thereby planarizing the surface of the first panel unit 10. The reflective electrodes 63 are formed on the planarizing film 14b for the respective pixels 50. Because the circuit elements including the TFTs are formed on the first substrate 14, the first substrate 14 may be referred to as a TFT substrate. The first substrate 14 includes the circuit board 14a formed of a glass substrate on which each unit is mounted. Instead of the glass substrate, the circuit board 14a may be formed of a substrate made of a material other than glass. Alternatively, the circuit board 14a may be formed of a substrate made of a material that blocks light or a material that reflects light.

The signal lines are wiring that transmits a signal (a display signal or a video signal) for driving the pixels 50. The signal lines have a wiring structure extending along an array direction of pixels in pixel columns, that is, along a column direction (Y-direction in FIG. 1B) for the respective pixel columns with respect to the matrix arrangement of the pixels 50. The scanning lines are wiring that transmits a signal (a scanning signal) for selecting the pixels 50 row by row. The scanning lines have a wiring structure extending along an array direction of pixels in pixel rows, that is, along a row direction (X-direction in FIG. 1B) for the respective pixel rows with respect to the matrix arrangement of the pixels 50. The X-direction and the Y-direction are orthogonal to each other.

The second panel unit 20 includes a transparent electrode 21 made of an indium tin oxide (ITO) and the like, a color filter (CF) 22, a second substrate 23 made of a substrate material including transparent glass, a quarter-wave plate 24, a half-wave plate 25, and a polarizing plate 26 arranged in this order from the liquid-crystal layer 30 side. An anisotropic scattering member (LCF) 27 is provided between the second substrate 23 and the quarter-wave plate 24 in the second panel unit 20.

In the second panel unit 20, the color filter 22 has a structure in which filters in stripes of red (R), green (G), and blue (B) extending in the column direction (Y-direction) are repeatedly arranged at the same pitch as that of the pixels 50 in the row direction (X-direction), for example. Because the second substrate 23 includes the color filter 22, the second substrate 23 may be referred to as a CF substrate.

The reflective LCD panel 2 includes the first panel unit 10, the second panel unit 20 arranged in a manner facing the first panel unit 10, and the liquid-crystal layer 30 arranged between the first panel unit 10 and the second panel unit 20. The top surface (surface) of the second panel unit 20 serves as the display surface.

In the reflective LCD panel 2 having the configuration described above, the pixels 50 each have a reflective display area (a reflective display unit). The reflective display area includes the reflective electrode 63 formed for each pixel 50 on the surface of the planarizing film 14b of the first substrate 14 as described above. The reflective display area reflects external light passing through the second panel unit 20 and incident from the outside with the reflective electrode 63, thereby performing display with the reflected light.

1-2. Basic Pixel Circuit

Figure 2A:
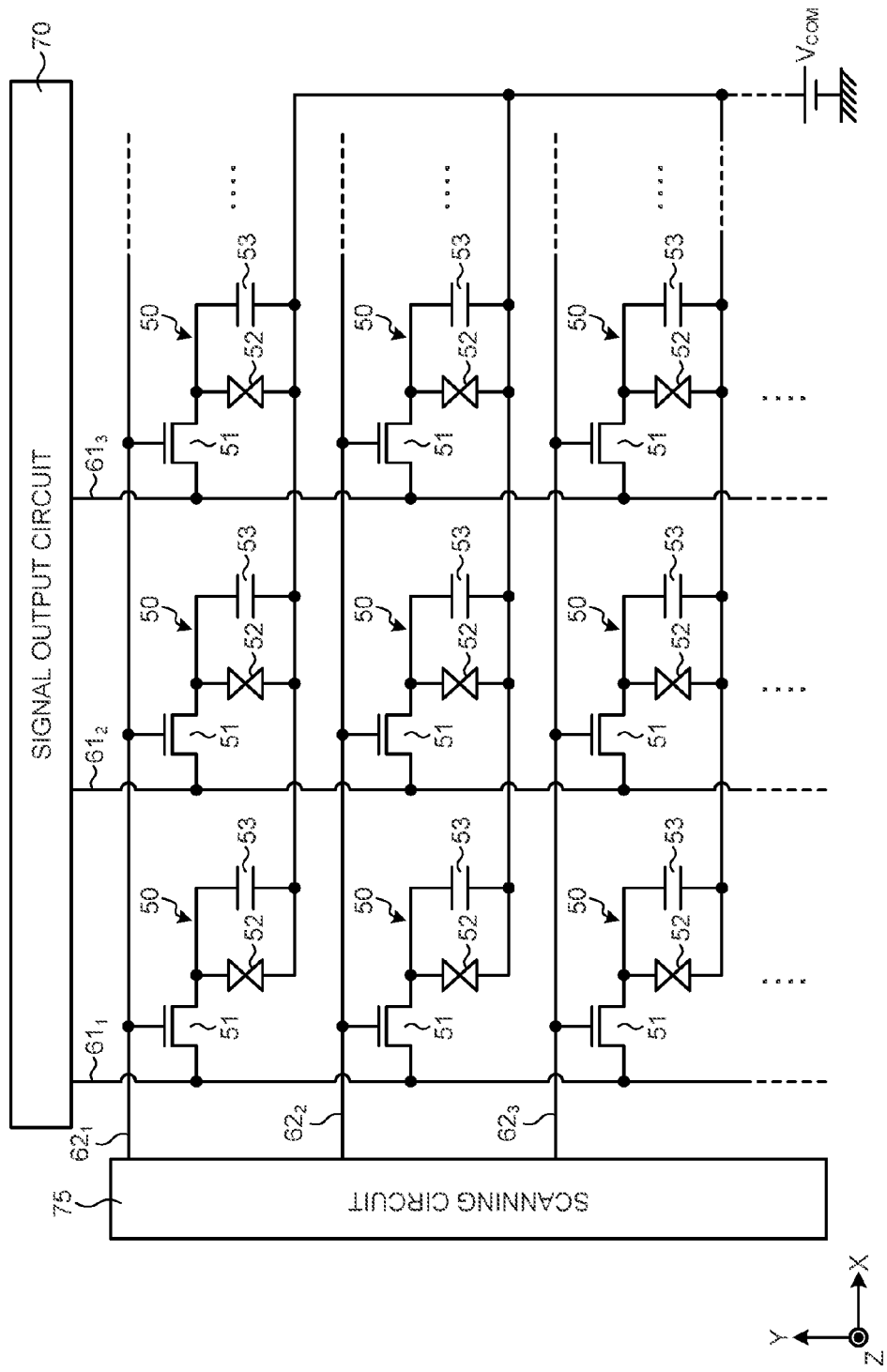
FIG. 2A is a circuit diagram of a basic pixel circuit.

A basic pixel circuit of the pixel 50 will now be described with reference to FIG. 2A. In FIG. 2A, a direction indicated by X (X-direction) represents the row direction of the reflective LCD device 1 illustrated in FIG. 1B, and a direction indicated by Y (Y-direction) represents the column direction thereof.

As illustrated in FIG. 2A, a plurality of signal lines 61 ($61_1, 61_2, 61_3, \ldots$) and a plurality of scanning lines 62 ($62_1, 62_2, 62_3, \ldots$) are arranged in a manner intersecting with each other. The pixels 50 are arranged at the intersections. The scanning lines 62 ($62_1, 62_2, 62_3, \ldots$) extend in the row direction (X-direction), whereas the signal lines 61 ($61_1, 61_2, 61_3, \ldots$) extend in the column direction (Y-direction). As described above, the signal lines 61 and the scanning lines 62 are formed on the surface of the first substrate (TFT substrate) 14 of the first panel unit 10. One end of each of the signal lines 61 ($61_1, 61_2, 61_3, \ldots$) are coupled to respective output terminals each corresponding to a column of a signal output circuit 70. One end of each of the scanning lines 62 ($62_1, 62_2, 62_3, \ldots$) are coupled to respective output terminals each corresponding to a row of a scanning circuit 75.

The pixel 50 includes a pixel transistor 51 formed of a TFT, a liquid-crystal capacity 52, and a holding capacity 53, for example. In the pixel transistor 51, a gate electrode is coupled to the scanning line 62 ($62_1, 62_2, 62_3, \ldots$), and a source electrode is coupled to the signal line 61 ($61_1, 61_2, 61_3, \ldots$).

The liquid-crystal capacity 52 is a capacity component of the liquid-crystal material generated between a pixel electrode and a counter electrode (corresponding to the transparent electrode 21 in FIG. 1A) formed in a manner facing the pixel electrode. The pixel electrode is coupled to a drain electrode of the pixel transistor 51. The pixel electrode corresponds to a reflective electrode formed for each sub-pixel in color display. A common potential $V_{COM}$ of a direct-current (DC) voltage is applied to the counter electrode of the liquid-crystal capacity 52 in common to all the pixels. A first electrode of the holding capacity 53 is coupled to the pixel electrode of the liquid-crystal capacity 52, and a second electrode thereof is coupled to the counter electrode of the liquid-crystal capacity 52.

As is clear from the pixel circuit described above, the signal lines 61 ($61_1, 61_2, 61_3, \ldots$) are wiring that transmits a signal for driving the pixels 50, that is, a video signal output from the signal output circuit 70 to the pixels 50 in each pixel column. The scanning lines 62 ($62_1, 62_2, 62_3, \ldots$) are wiring that transmits a signal for selecting the pixels 50 row by row, that is, a scanning signal output from the scanning circuit 75 to each pixel row.

1-3. Pixel and a Sub-Pixel

Figure 2B:
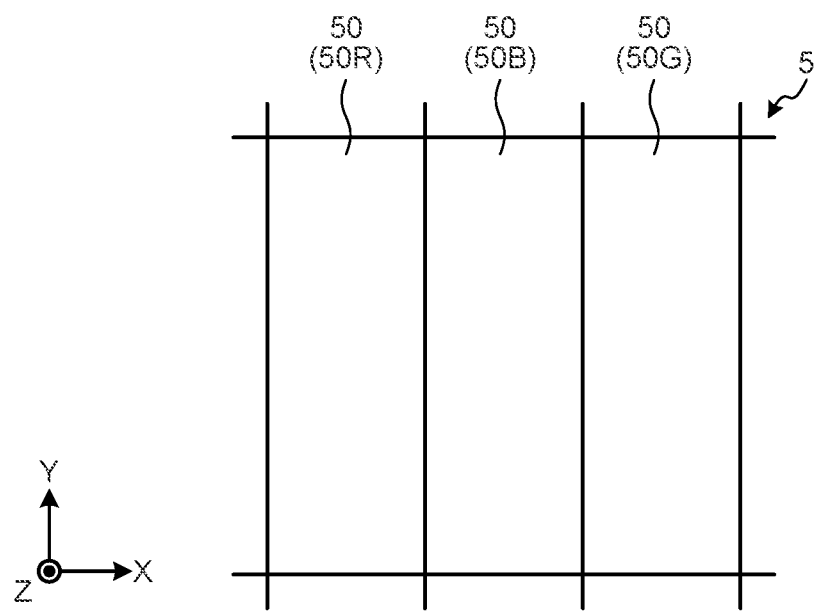
FIG. 2B is a schematic of pixels in color display.

In the case where the reflective LCD device 1 supports color display, one pixel serving as a unit that constitutes a color image, that is, a unit pixel 5 includes a plurality of sub-pixels 50 as illustrated in FIG. 2B, for example. In this example, the unit pixel 5 includes a sub-pixel 50R that displays R, a sub-pixel 50B that displays B, and a sub-pixel 50G that displays G. The sub-pixels 50R, 50B, and 50G included in the unit pixel 5 are arrayed in the X-direction, that is, in the row direction of the reflective LCD device 1.

1-4. Electrode Structure of a Pixel Unit

Figure 3:
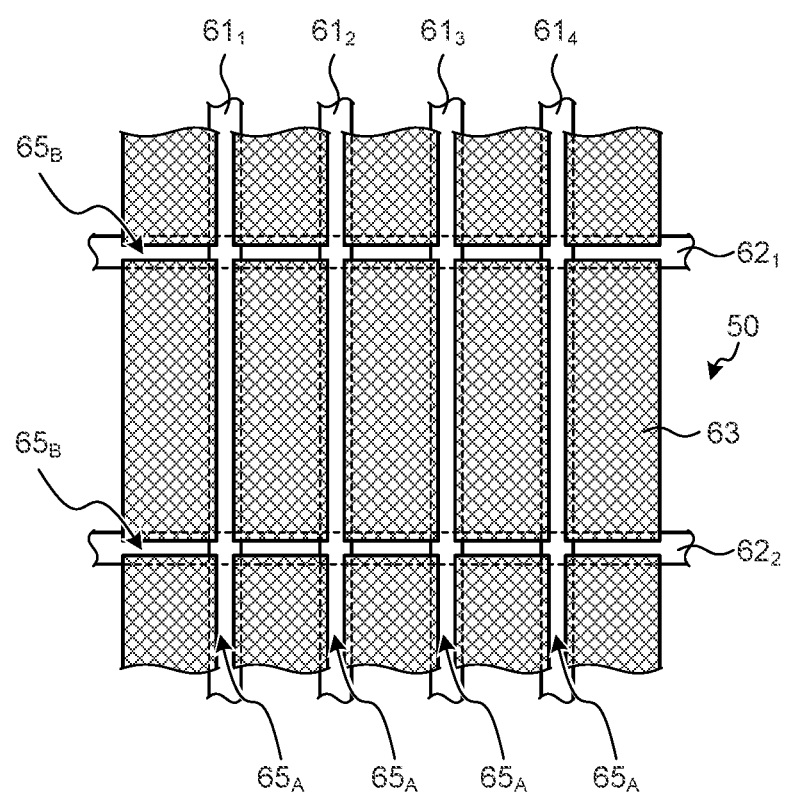
FIG. 3 is a plan view of a pixel unit of the reflective LCD device.

FIG. 3 is a view for explaining an electrode structure of a pixel unit. FIG. 3 is a plan view of a pixel unit of a reflective (total reflective) LCD device. In FIG. 3, the reflective electrode 63 is indicated by hatching.

As illustrated in FIG. 3, the pixel unit of the reflective LCD device 1 has the following configuration: the pixels 50 are arranged in a matrix; the signal lines 61 are arranged at spaces $65_A$ between the pixels 50 extending along the column direction in the matrix array; and the scanning lines 62 are arranged at spaces $65_B$ between the pixels 50 extending along the row direction. As described above, the signal lines 61 and the scanning lines 62 are arranged in a manner intersecting with each other on the first substrate 14 of the first panel unit 10 in FIG. 1B.

In the pixel unit (pixel array unit) having such a configuration, the reflective electrode 63 made of a metal, such as aluminum, is formed in substantially the same size as that of the pixel 50 in the reflective LCD device 1 illustrated in FIG. 3. The reflective LCD device 1 uses the area of the reflective electrode 63 as the reflective display area. In other words, the reflective LCD device 1 secures the reflective display area having substantially the same size as that of the pixel 50, thereby providing desired reflective display performance.

1-5. Method for Driving the LCD Panel

In the LCD panel (LCD device), continuous application of a DC voltage of the same polarity to the liquid crystal deteriorates the resistivity (substance-specific resistance) and the like of the liquid crystal. To suppress the deterioration, the LCD panel (LCD device) employs a driving method for inverting the polarity of video signals at a predetermined period based on the common potential $V_{COM}$.

Some types of methods for driving an LCD panel are known, including line inversion driving method, dot inversion driving method, and frame inversion driving method. The line inversion driving method is a driving method for inverting the polarity of video signals at a time period of 1H (H represents a horizontal period) corresponding to one line (one pixel row). The dot inversion driving method is a driving method for alternately inverting the polarity of video signals for pixels vertically and horizontally adjacent to each other. The frame inversion driving method is a driving method for inverting the polarity of video signals to be written to all the pixels in one frame corresponding to one screen with the same polarity at a time.

In the frame inversion driving method, the reflective LCD device 1 applies a signal voltage of the same polarity to the signal lines 61 during one frame period. As a result, shading may possibly occur. To address this, the reflective LCD device 1 employs what is called a memory in pixel (MIP) technology to perform the frame inversion driving method. The MIP technology uses pixels having a memory function, that is, pixels each provided with a memory capable of storing data therein as the pixels 50, for example. The MIP technology constantly applies a steady voltage to the pixels 50, thereby reducing the shading.

In the MIP technology, the pixels each have a memory that stores data therein. This enables display in an analog display mode and display in a memory display mode. The analog display mode is a display mode for displaying the gradation of a pixel in an analog manner. The memory display mode is a display mode for displaying the gradation of a pixel in a digital manner based on binary information (logic "1"/logic "0") stored in the memory in the pixel.

Because the memory display mode uses the information stored in the memory, it is not necessary to perform a writing operation of a signal potential reflecting the gradation at a frame period. As a result, the memory display mode requires lower power consumption than the analog display mode that needs to perform a writing operation of a signal potential reflecting the gradation at a frame period. In other words, it is possible to reduce the power consumption of the reflective LCD device 1.

Figure 4:
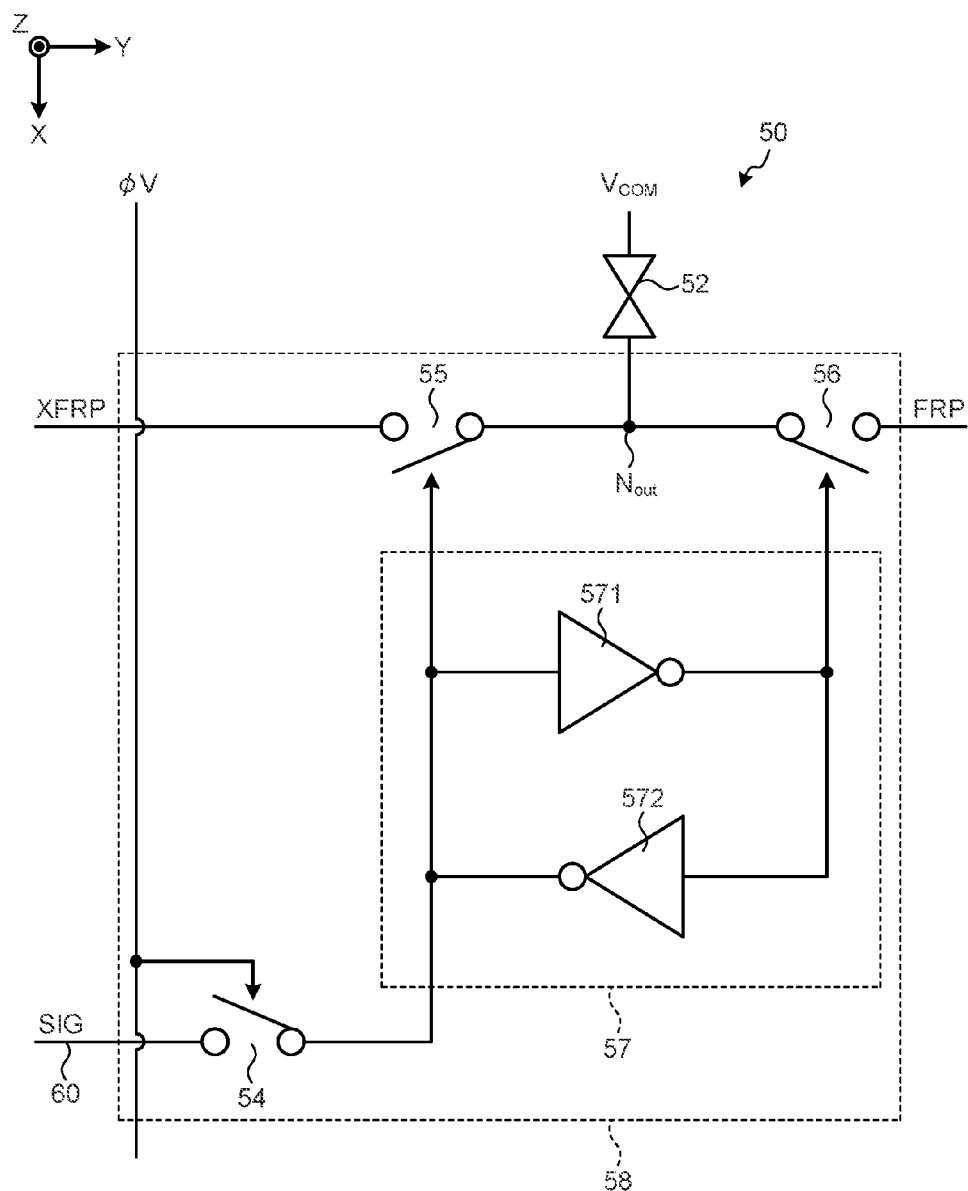
FIG. 4 is a block diagram of an exemplary circuit configuration of a pixel provided with the MIP technology.
Figure 5:
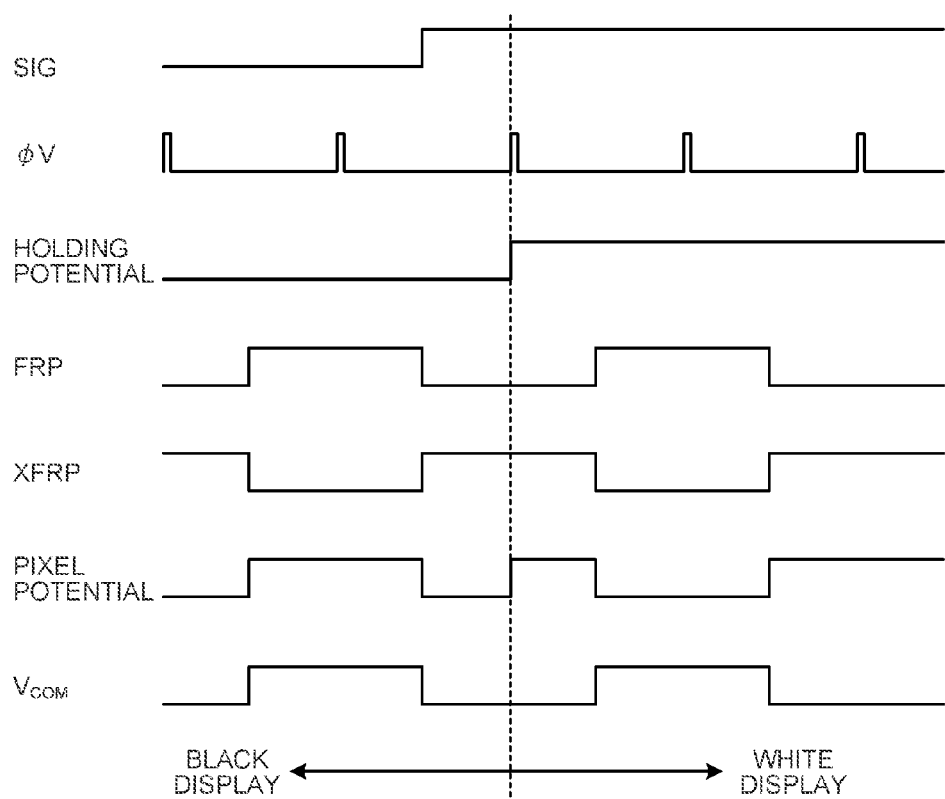
FIG. 5 is a timing chart for explaining an operation of the pixel provided with the MIP technology.

FIG. 4 is a block diagram of an exemplary circuit configuration of a pixel employing the MIP technology. In FIG. 4, components equivalent to those in FIG. 2A are denoted by like reference numerals. FIG. 5 is a timing chart for explaining an operation of the pixel employing the MIP technology.

As illustrated in FIG. 4, the pixel 50 includes a drive circuit unit 58 provided with three switching elements 54 to 56 and a latch 57 in addition to the liquid-crystal capacity (liquid-crystal cell) 52. The drive circuit unit 58 has a static random access memory (SRAM) function. The pixel 50 including the drive circuit unit 58 has a pixel configuration with the SRAM function. The liquid-crystal capacity (liquid-crystal cell) 52 is a liquid-crystal capacity generated between a pixel electrode (e.g., the reflective electrode 63 in FIG. 3) and a counter electrode arranged in a manner facing the pixel electrode.

One end of the switching element 54 is coupled to one of the signal lines 61 (corresponding to the signal lines $61_1$ to $61_3$ in FIG. 2A). By receiving a scanning signal φV from the scanning circuit 75 illustrated in FIG. 2A, the switching element 54 is turned into the on (closed) state. As a result, the switching element 54 retrieves data SIG supplied from the signal output circuit 70 illustrated in FIG. 2A via the signal line 61. The latch 57 includes inverters 571 and 572 coupled in a manner parallel and opposite to each other. The latch 57 holds (latches) an electric potential corresponding to the data SIG retrieved by the switching element 54.

First ends of the switching elements 55 and 56 are supplied with a control pulse XFRP in the opposite phase of the common potential $V_{COM}$ and a control pulse FRP in the same phase as the common potential $V_{COM}$, respectively. Second ends of the switching elements 55 and 56 are commonly coupled, and the common connection node serves as an output node $N_{out}$ in the pixel circuit. One of the switching elements 55 and 56 is turned into the on-state depending on the polarity of the holding potential in the latch 57. This applies the control pulse FRP or the control pulse XFRP to the pixel electrode (e.g., the reflective electrode 63 in FIG. 3) in the liquid-crystal capacity 52 where the common potential $V_{COM}$ is applied to the counter electrode (e.g., the transparent electrode 21 in FIG. 1A).

As is clear from FIG. 5, if the polarity of the holding potential in the latch 57 is negative, the pixel potential of the liquid-crystal capacity 52 is in the same phase as that of the common potential $V_{COM}$, resulting in black display in the present embodiment. If the polarity of the holding potential in the latch 57 is positive, the pixel potential of the liquid-crystal capacity 52 is in the opposite phase of the common potential $V_{COM}$, resulting in white display.

As described above, the pixel 50 of MIP turns one of the switching elements 55 and 56 into the on-state depending on the polarity of the holding potential in the latch 57. This applies the control pulse FRP or the control pulse XFRP to the pixel electrode (e.g., the reflective electrode 63 in FIG. 3) of the liquid-crystal capacity 52. As a result, a steady voltage is constantly applied to the pixel 50, thereby suppressing shading.

While the explanation has been made of the case where the pixel 50 is provided with an SRAM as the internal memory in the present embodiment, the SRAM is given just as an example. The pixel 50 may be provided with another memory, such as a dynamic random access memory (DRAM), for example.

To employ the MIP technology, the present embodiment can use an area coverage modulation method or a time division modulation method, for example. In the time division modulation method, it is required to vary the pixel potential with time to move liquid-crystal molecules in a pixel and between pixels to move even when in a still image id displayed. Thus, the area coverage modulation method is more preferably used than the time division modulation method.

While a pixel of MIP having a memory capable of storing data therein is used as the pixel having a memory function in the description above, this is given just as an example. Examples of the pixel having a memory function include, but are not limited to, a pixel provided with a well-known memory liquid crystal etc. besides the pixel of MIP.

Display modes of liquid crystals include a normally white mode and a normally black mode. In the normally white mode, application of no electric field (voltage) causes the liquid crystal to perform white display, and application of an electric field causes the liquid crystal to perform black display. In the normally black mode, application of no electric field causes the liquid crystal to perform black display, and application of an electric field causes the liquid crystal to perform white display. The modes are the same in the structure of the liquid-crystal cell and different in the arrangement of the polarizing plate 11 illustrated in FIG. 1A. The reflective LCD device 1 according to the present embodiment is driven in the normally black mode. In the normally black mode, application of no electric field (voltage) causes the liquid crystal to perform black display, and application of an electric field causes the liquid crystal to perform white display.

1-6. Anisotropic Scattering Member

Figure 6:
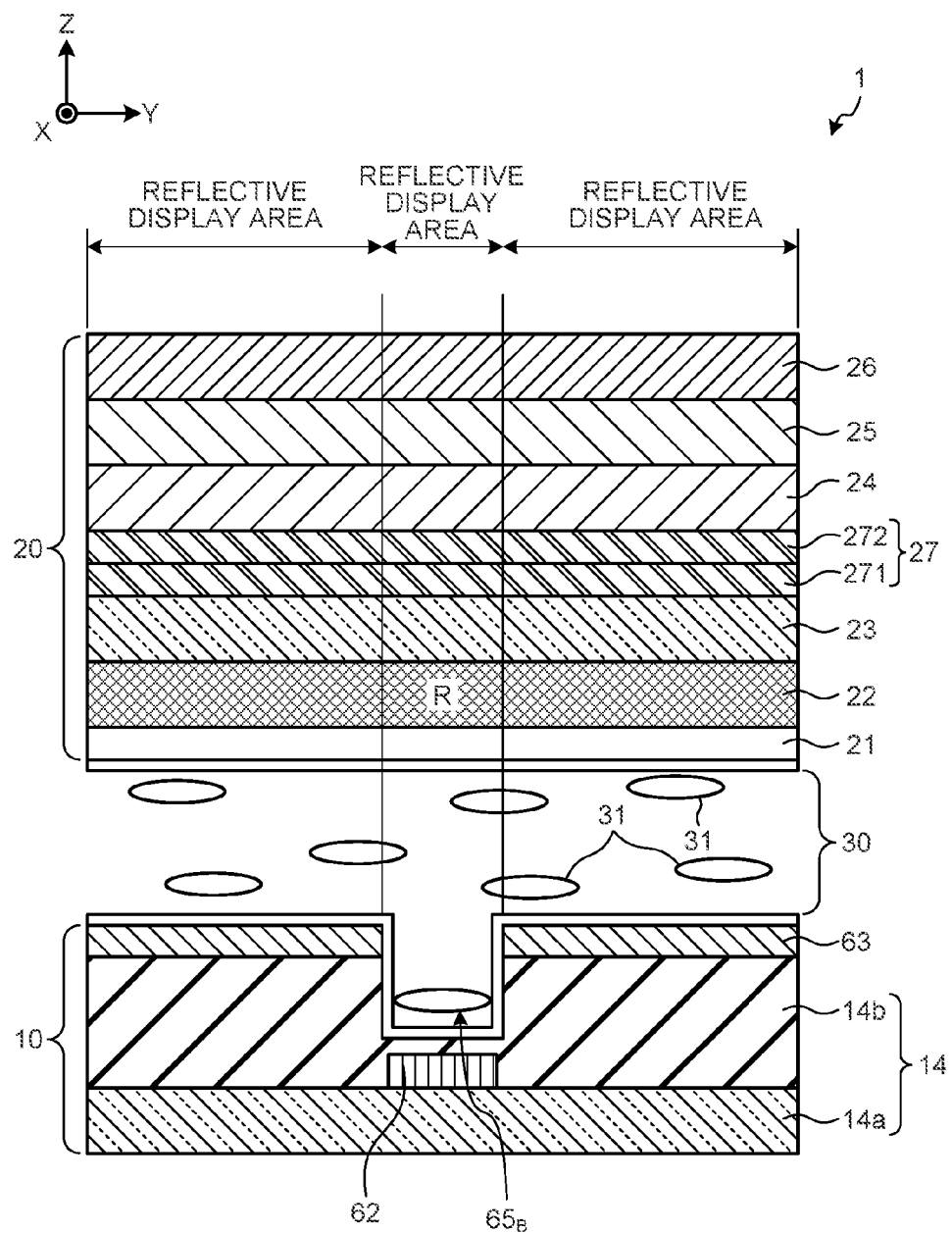
FIG. 6 is a sectional view of a sectional structure of two pixels adjacent to each other in the column direction of the reflective LCD device.
Figure 7A:
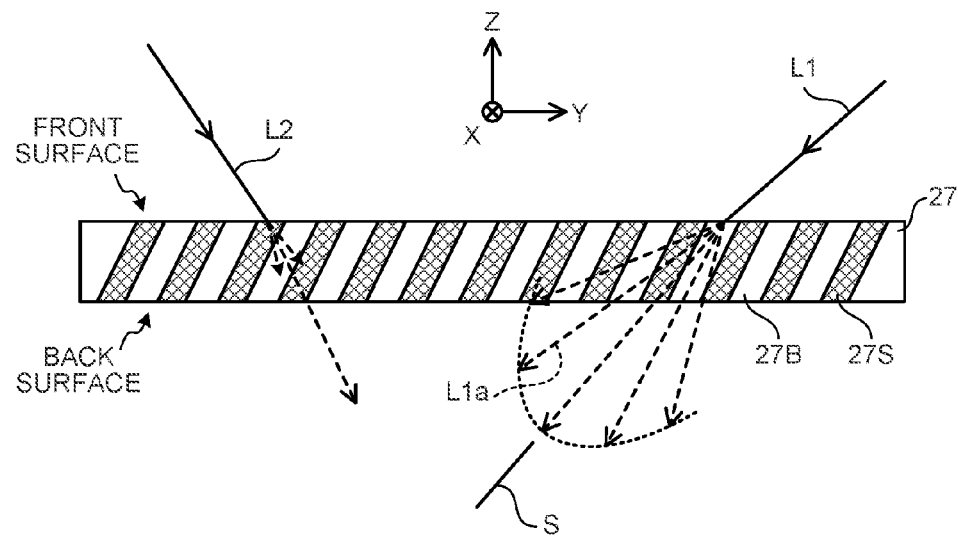
FIG. 7A is a sectional view of an anisotropic scattering member on which external light is incident from the front surface.
Figure 7B:
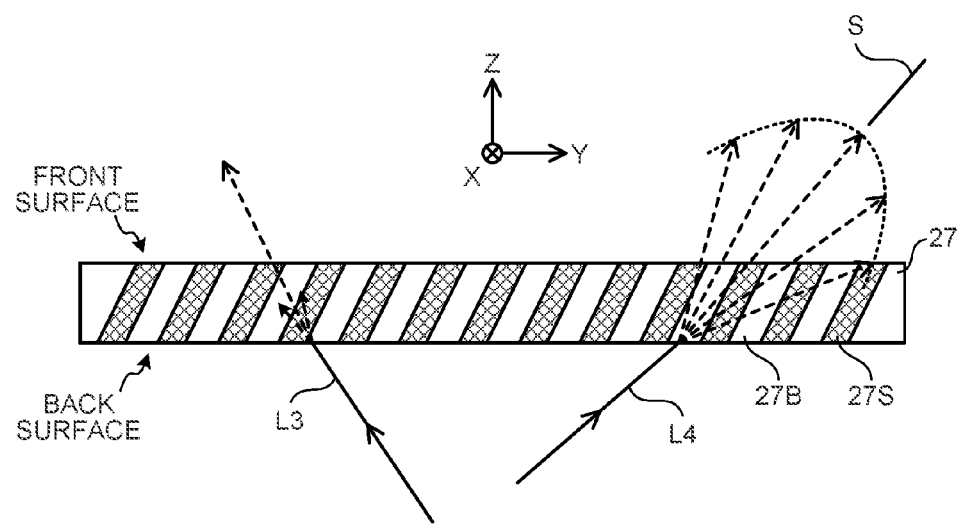
FIG. 7B is a sectional view of the anisotropic scattering member on which incident light is incident from the back surface.
Figure 8:
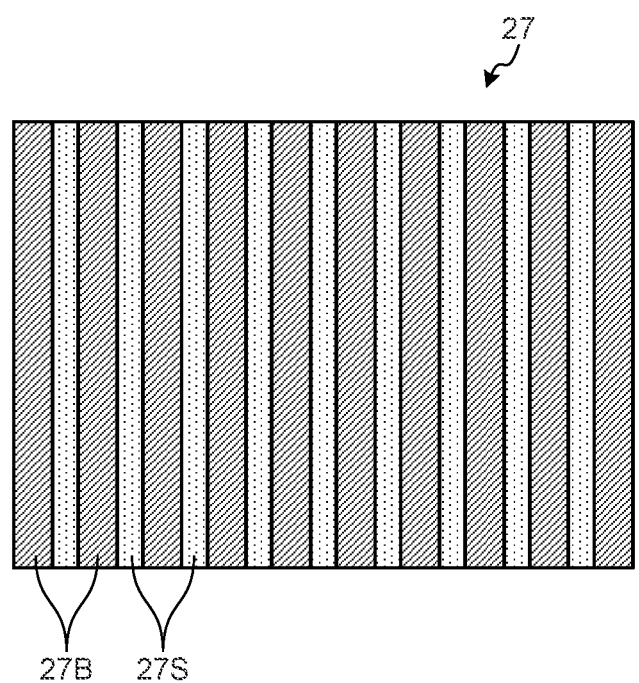
FIG. 8 is a plan view of an example of the anisotropic scattering member.
Figure 9A:
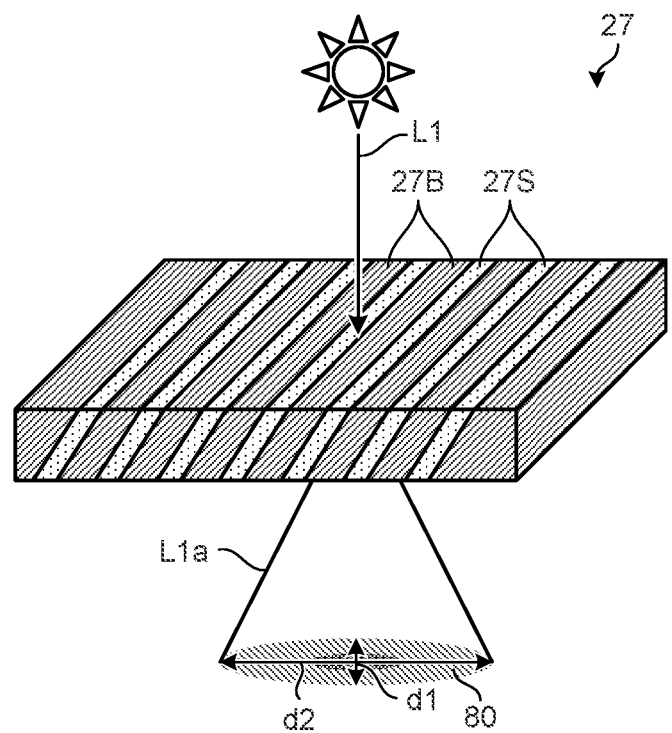
FIG. 9A is a schematic for explaining a function of the anisotropic scattering member.
Figure 9B:
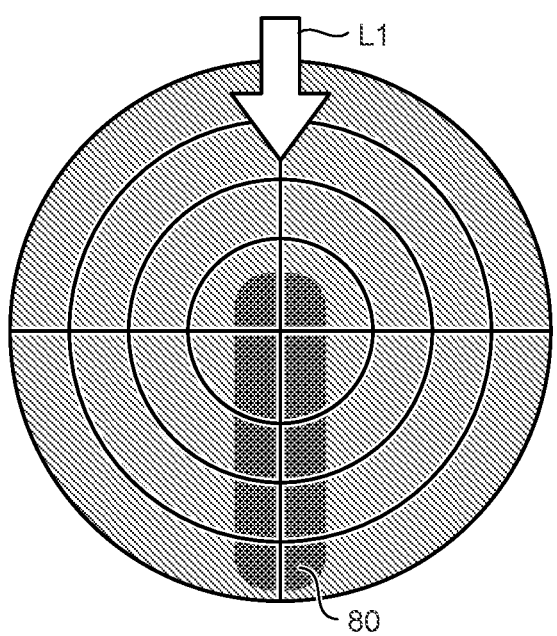
FIG. 9B is a schematic for explaining a function of the anisotropic scattering member.
Figure 10:
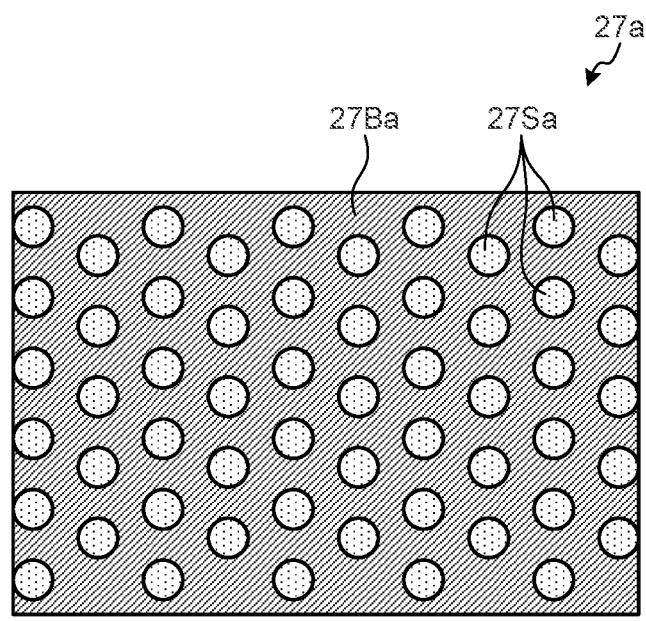
FIG. 10 is a plan view of another example of the anisotropic scattering member.
Figure 11A:
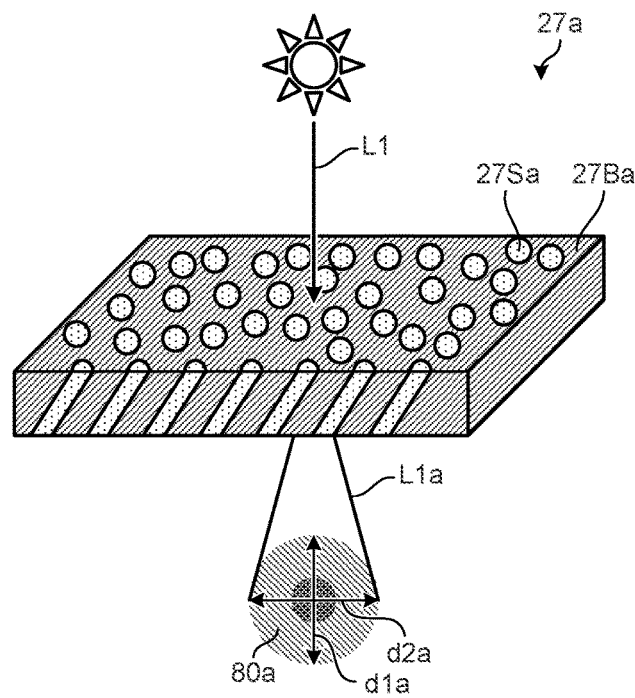
FIG. 11A is a schematic for explaining a function of the anisotropic scattering member.
Figure 11B:
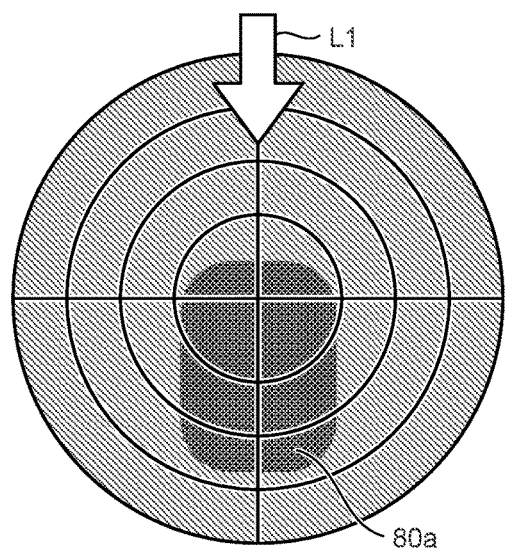
FIG. 11B is a schematic for explaining a function of the anisotropic scattering member.

FIG. 6 is a sectional view of a sectional structure of two pixels adjacent to each other in the column direction (Y-direction) of the reflective LCD device. In FIG. 6, components equivalent to those in FIGS. 1A and 1B are denoted by like reference numerals. FIG. 7A is a sectional view of an anisotropic scattering member on which external light is incident from the front surface. FIG. 7B is a sectional view of the anisotropic scattering member on which incident light is incident from the back surface. FIG. 8 is a plan view of an example of the anisotropic scattering member. FIG. 9A and FIG. 9B are schematics for explaining a function of the anisotropic scattering member. FIG. 10 is a plan view of another example of the anisotropic scattering member. FIG. 11A and FIG. 11B are schematics for explaining a function of the anisotropic scattering member.

As illustrated in FIG. 6, the reflective LCD device 1 includes the sheet-like anisotropic scattering member 27 that scatters light. The anisotropic scattering member 27 is arranged at a position further in a traveling direction of light reflected by the reflective electrode 63 than the liquid-crystal layer 30. More specifically, the reflective LCD device 1 is provided with the anisotropic scattering member 27 between the second substrate 23 and the quarter-wave plate 24. The scanning line 62 is arranged between the reflective electrodes 63 in the reflective LCD device 1 as described above. The scanning line 62 is made of a metal that reflects light. This configuration enables the reflective LCD device 1 to use the area in which the scanning line 62 is arranged as the reflective display area besides the area in which the reflective electrode 63 is arranged. The anisotropic scattering member 27 is an anisotropic or isotropic layer that scatters light reflected by the reflective electrode 63 and the scanning line 62. The anisotropic scattering member 27 includes two laminated anisotropic scattering sheets 271 and 272. A LCF may be used as the anisotropic scattering sheets 271 and 272 of the anisotropic scattering member 27, for example. The anisotropic scattering member 27 includes the anisotropic scattering sheets 271 and 272 having similar functions. The anisotropic scattering sheets 271 and 272 are hereinafter correctively referred to as the anisotropic scattering member 27.

The anisotropic scattering member 27 is a forward scattering layer that scatters light forward largely and backward small. The anisotropic scattering member 27 is an anisotropic scattering layer that scatters light incident in a specific direction (a scattering axis direction). If light (e.g., external light) is incident in the specific direction from the polarizing plate 26 side with respect to the second substrate 23, the anisotropic scattering member 27 transmits the incident light almost without scattering the light. The anisotropic scattering member 27 significantly scatters light (reflected light) reflected and returned by the reflective electrode 63.

As illustrated in FIG. 7A and FIG. 7B, the anisotropic scattering member 27 includes a first area 27B and a second area 27S. The two types of areas 27B and 27S have different refractive indexes. The anisotropic scattering member 27 may have a louver structure in which a plurality of plate-like second areas 27S are arranged at predetermined intervals in the first area 27B as illustrated in FIG. 8, FIG. 9A, and FIG. 9B. Alternatively, an anisotropic scattering member 27a may have a columnar structure in which columnar second areas 27Sa are arranged in a first area 27Ba as illustrated in FIG. 10, FIG. 11A, and FIG. 11B. In the present embodiment, the first area 27B is made of a material having a refractive index lower than that of the second area 27S. In other words, the first area 27B is made of a material having a relatively low refractive index and serves as a low refractive index area in the anisotropic scattering member 27. The second area 27S is made of a material having a relatively high refractive index and serves as a high refractive index area in the anisotropic scattering member 27.

The anisotropic scattering member 27 is arranged as follows: light is scattered when the light is incident from the surface in which a change in the refractive index near the boundary between the first area (low refractive index area) 27B and the second area (high refractive index area) 27S is relatively large and exiting from the surface in which a change in the refractive index near the boundary between the low refractive index area 27B and the high refractive index area 27S is relatively small.

In the anisotropic scattering member 27, the first area 27B and the second area 27S extend in the thickness direction and are inclined in a predetermined direction, for example. The anisotropic scattering member 27 is formed by irradiating a resin sheet that is a mixture of two or more types of photopolymerizable monomers or oligomers having different refractive indexes with ultraviolet rays in an oblique direction, for example. The anisotropic scattering member 27 may have another structure different from the structure described above and may be manufactured by another method different from the method described above. The anisotropic scattering member 27 may be formed of one layer or a plurality of layers. In the case where the anisotropic scattering member 27 is formed of a plurality of layers, the layers may have the same structure or structures different from one another.

As illustrated in FIG. 7A, the anisotropic scattering member 27 scatters external light L1 when the external light L1 is incident in a first predetermined direction (the scattering axis direction) with respect to the second substrate 23, for example. The anisotropic scattering member 27 transmits external light L2 when the external light L2 is incident in a second predetermined direction (a direction other than the scattering axis direction). The anisotropic scattering member 27 transmits the external light L2 when the external light L2 is incident in the second predetermined direction. The anisotropic scattering member 27 then scatters light reflected by the reflective electrode 63 out of the transmitted light in a predetermined range about a scattering central axis S. The external light L1 and L2 is parallel light incident on the polarizing plate 26 of the second panel unit 20. The external light L1 and L2 may be non-polarized light or polarized light. Similarly, if incident light L3 and L4 is incident from the side opposite to the external light L1 and L2, the anisotropic scattering member 27 scatters light incident in one direction (the scattering axis direction) with respect to the second substrate 23, and transmits light incident in another direction (a direction other than the scattering axis direction) as illustrated in FIG. 7B, for example. Specifically, the anisotropic scattering member 27 transmits the incident light L3 when the incident light L3 is incident in a third predetermined direction with respect to the second substrate 23. The anisotropic scattering member 27 scatters the incident light L4 when the incident light L4 is incident in a fourth predetermined direction. The first and fourth predetermined directions are the same direction except that the extending directions thereof are opposite to each other by 180 degrees. The second and third predetermined directions are the same direction except that the extending directions thereof are opposite to each other by 180 degrees. The light simply needs to be scattered while passing through the anisotropic scattering member 27. The light may be scattered when being incident on the anisotropic scattering member 27 or when exiting therefrom, or may be scattered in the path.

If the anisotropic scattering member 27 has the louver structure illustrated in FIG. 8, the anisotropic scattering member 27 scatters the external light L1 into scattered light L1a as illustrated in FIG. 9A. A scattering range 80 of the scattered light L1a has an elliptical shape having a diameter d1 extending along the long-side direction of the first area 27B and the second area 27S as the minor axis and a diameter d2 extending along the short-side direction of the first area 27B and the second area 27S (array direction of the first area 27B and the second area 27S) as the major axis. Similarly, the anisotropic scattering member 27 scatters the light reflected by the reflective electrode 63 into scattered light having an elliptical shape. If the external light L1 is incident on the anisotropic scattering member 27 at a predetermined angle along the scattering direction, specifically at 30 degrees, for example, the scattering range 80 extends in the incident direction of the external light L1 as illustrated in FIG. 9B. If the anisotropic scattering member 27a has the columnar structure illustrated in FIG. 10, the anisotropic scattering member 27a scatters the external light L1 into scattered light L1a as illustrated in FIG. 11A. A scattering range 80a of the scattered light L1a has a circular shape in which a diameter d1a and a diameter d2a are the same in length. Similarly, the anisotropic scattering member 27a scatters the light reflected by the reflective electrode 63 into scattered light having a circular shape. If the external light L1 is incident on the anisotropic scattering member 27a at a predetermined angle along the scattering direction, specifically at 30 degrees, for example, the scattering range 80a extends both in the incident direction of the external light L1 and a direction orthogonal to the incident direction as illustrated in FIG. 11B.

1-7. Arrangement of the Color Filter

Figure 12A:
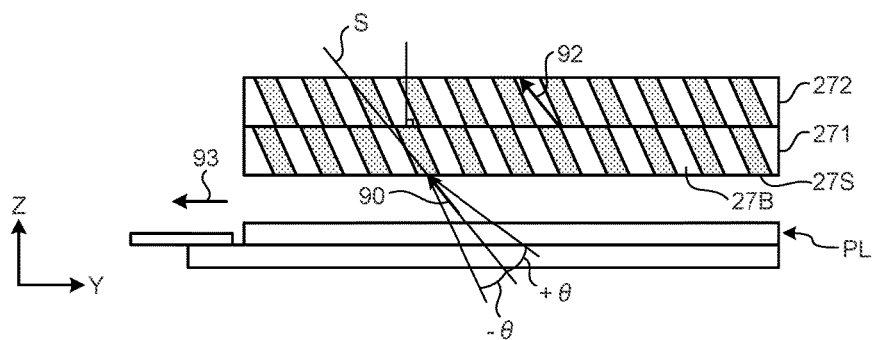
FIG. 12A is a schematic of a relation between a scattering axis direction of the anisotropic scattering member and a main viewing angle direction of a liquid-crystal panel.
Figure 12C:
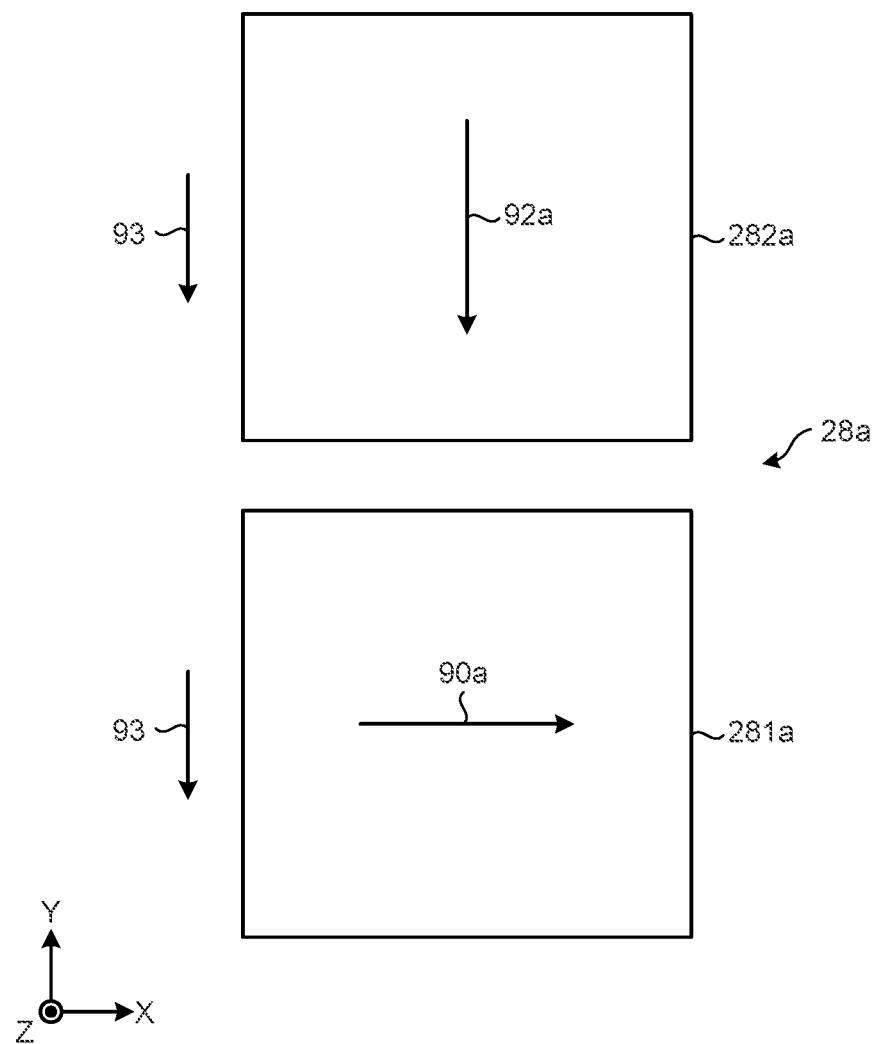
FIG. 12C is a schematic of scattering axis directions of an anisotropic scattering member according to another example.
Figure 12D:
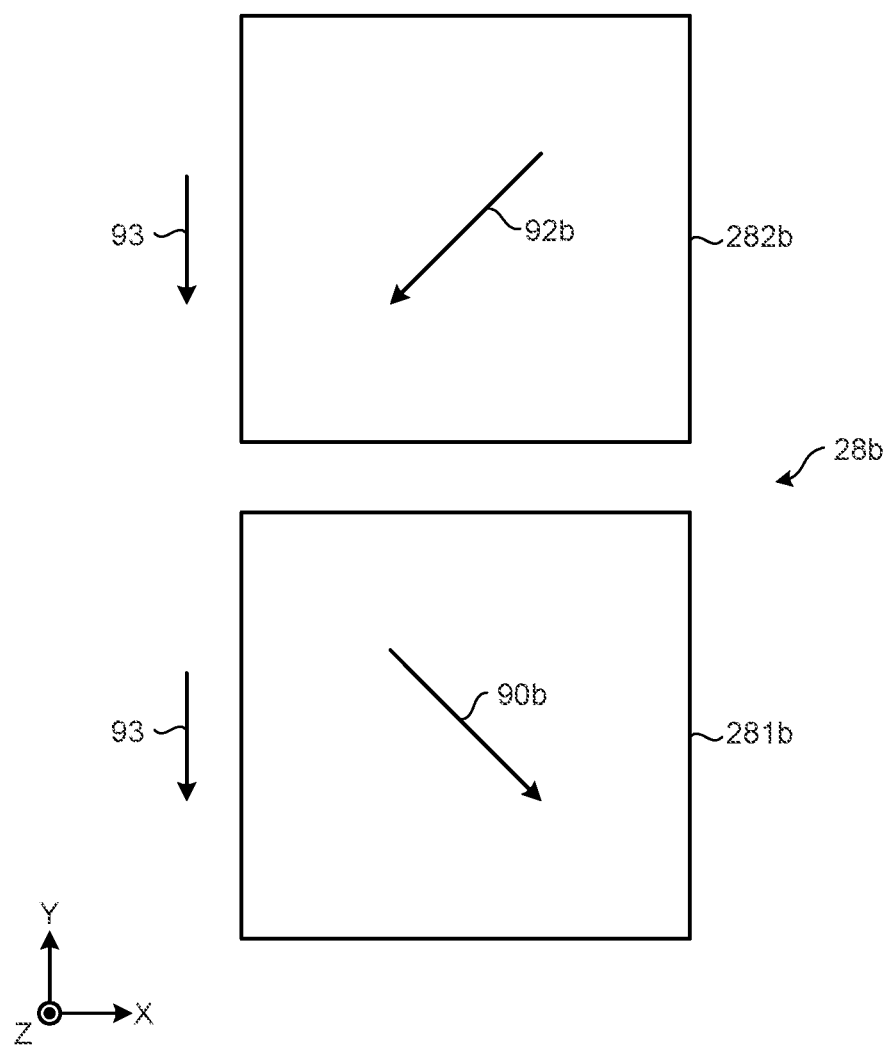
FIG. 12D is a schematic of scattering axis directions of the anisotropic scattering member according to another example.

FIG. 12A is a schematic of a relation between the scattering axis directions of the anisotropic scattering member and a main viewing angle direction of the liquid-crystal panel. FIG. 12B is a schematic of a relation of the arrangement of the color filter, the scattering axis directions of the anisotropic scattering member, and the main viewing angle direction of the liquid-crystal panel. FIG. 12C and FIG. 12D are schematics of scattering axis directions of anisotropic scattering members according to other examples. As illustrated in FIG. 12A, the part from the first panel unit 10 to the second substrate 23 of the second panel unit 20 via the liquid-crystal layer 30 is referred to as a liquid-crystal panel PL. In FIG. 12A, the anisotropic scattering member 27 and the liquid-crystal panel PL are separated from each other to facilitate understanding of the relation between scattering axis directions 90 and 92 of the anisotropic scattering member 27 and a main viewing angle direction 93 of the liquid-crystal panel PL.

The scattering central axis S is an axis about which incident light has anisotropic scattering characteristics of substantial symmetry, that is, an axis extending in an incident direction of light scattering the most. The scattering central axis S of the anisotropic scattering member 27 is inclined with respect to the normal direction of the surface on the display side of the anisotropic scattering member 27. In the liquid-crystal panel PL, a predetermined direction intersecting with the display surface (that is, the boundary surface between the liquid-crystal panel PL and the anisotropic scattering member 27) is defined as the main viewing angle direction 93. The main viewing angle direction 93 is inclined with respect to the display surface of the liquid-crystal panel PL. The main viewing angle corresponds to an azimuth in which a user of the reflective LCD device 1 sees the video display surface when using the reflective LCD device 1. In the case of the video display surface having a square shape, the main viewing angle corresponds to an azimuth orthogonal to the side closest to the user out of the sides of the video display surface.

An assumption is made that the incident light L4 incident on the anisotropic scattering member 27 from the liquid-crystal panel PL passes through the anisotropic scattering member 27, thereby being scattered. In this case, the incident direction of the incident light L4 coincides with the scattering axis directions 90 and 92. In other words, the incident light L4 incident on the anisotropic scattering member 27 along the scattering axis directions 90 and 92 passes through the anisotropic scattering member 27, thereby being scattered. The scattering axis directions 90 and 92 each contain the direction in which the scattering central axis S extends and a direction inclined with respect to the scattering central axis S by a predetermined angle. In other words, the scattering axis directions 90 and 92 are a direction having a predetermined angular range containing the scattering central axis S. The predetermined angular range is inclined with respect to the scattering central axis S by ±θ degree. θ is set equal to or smaller than 20 degrees, for example. More preferably, θ is set to 15 degrees.

The scattering axis directions 90 and 92 of the anisotropic scattering member 27 and the main viewing angle direction 93 of the liquid-crystal panel PL are inclined to the same side with respect to the normal direction of the display surface of the liquid-crystal panel PL. In the present embodiment, the scattering axis directions 90 and 92 of the anisotropic scattering member 27 is the same direction as the main viewing angle direction 93 of the liquid-crystal panel PL when viewed from the Z-direction.

In the anisotropic scattering member 27, the scattering axis direction 90 of the anisotropic scattering sheet 271 is the same direction as the scattering axis direction 92 of the anisotropic scattering sheet 272. In addition, the scattering axis directions 90 and 92 of the anisotropic scattering member 27 are the same direction as the main viewing angle direction 93 when viewed from the Z-direction. In the anisotropic scattering member 28a illustrated in FIG. 12C, a scattering axis direction 90a of an anisotropic scattering sheet 281a is orthogonal to the main viewing angle direction 93 when viewed from the Z-direction, and a scattering axis direction 92a of an anisotropic scattering sheet 282a is the same direction as the main viewing angle direction 93 when viewed from the Z-direction. In other words, the scattering axis direction 92a of the anisotropic scattering sheet 282a, which is a part of the anisotropic scattering member 28a, is the same direction as the main viewing angle direction 93 when viewed from the Z-direction. In an anisotropic scattering member 28b illustrated in FIG. 12D, a scattering axis direction 90b of an anisotropic scattering sheet 281b is inclined with respect to the main viewing angle direction 93 by 45 degrees when viewed from the Z-direction, and a scattering axis direction 92b of an anisotropic scattering sheet 282b is inclined with respect to the main viewing angle direction 93 by 45 degrees to the opposite side of the scattering axis direction 90b when viewed from the Z-direction. In the anisotropic scattering member 27 according to the present embodiment, both the scattering axis direction 90 and the scattering axis direction 92 are the same direction as the main viewing angle direction 93 when viewed from the Z-direction. This enables the anisotropic scattering member 27 to scatter light more in a direction parallel to the main viewing angle direction 93 than the anisotropic scattering member 28a illustrated in FIG. 12C and the anisotropic scattering member 28b illustrated in FIG. 12D. In addition, the anisotropic scattering member 27 can suppress scattering of light in a direction orthogonal to the main viewing angle direction 93.

The color filter 22 includes a filter 22R of R corresponding to the sub-pixel 50R that displays R, a filter 22B of B corresponding to the sub-pixel 50B that displays B, and a filter 22G of G corresponding to the sub-pixel 50G that displays G. In the color filter 22, the filters of the same color are aligned in the Y-axis direction as illustrated in FIG. 12B. In the color filter 22, the filter 22R, the filter 22G, and the filter 22B are aligned in order in the X-axis direction. As a result, the color filter 22 has boundaries 94 between the filters of different colors extending in the Y-axis direction. In the reflective LCD device 1 according to the present embodiment, the extending directions of the boundaries 94 are in the same direction as the main viewing angle direction 93 of the liquid-crystal panel PL and the scattering axis directions 90 and 92 when viewed from the Z-direction.

In the color filter 22, the color filters corresponding to a plurality of sub-pixels constituting one pixel (a unit pixel) are aligned in the X-axis direction orthogonal to the main viewing angle direction 93 of the liquid-crystal panel PL and the scattering axis directions 90 and 92 when viewed from the Z-direction. As a result, the color filter 22 has any one of the filter 22R, the filter 22G, and the filter 22B arranged in the Y-direction at any position in the X-axis direction in one pixel (a unit pixel). In the color filter 22, the main viewing angle direction 93 of the liquid-crystal panel PL and the scattering axis directions 90 and 92 are the direction in which the transmittance varies the least in one pixel (a unit pixel including a plurality of sub-pixels).

Figure 13A:
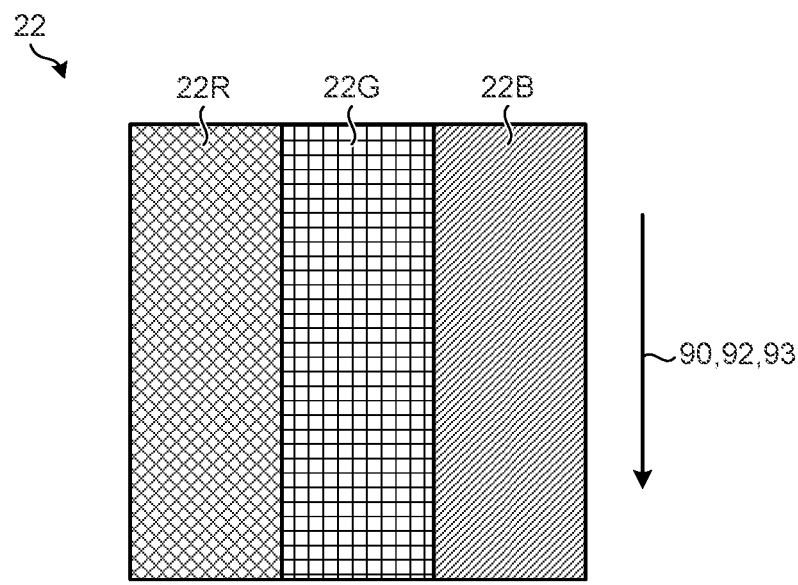
FIG. 13A is a schematic of a relation of the arrangement of filters of respective colors in the color filter, the scattering axis directions of the anisotropic scattering member, and the main viewing angle direction of the liquid-crystal panel.
Figure 13B:
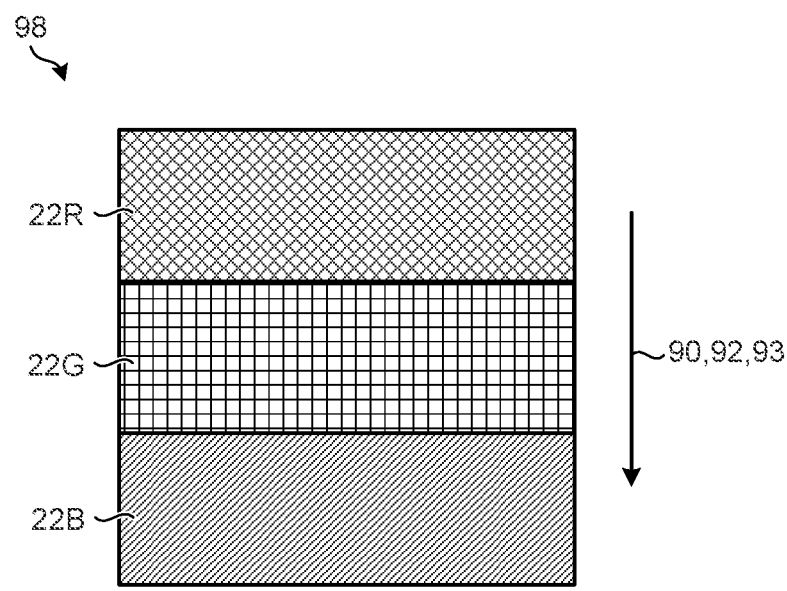
FIG. 13B is a schematic of a relation of the arrangement of filters of respective colors in a color filter, the scattering axis directions of the anisotropic scattering member, and the main viewing angle direction of the liquid-crystal panel according to a comparative example.

FIG. 13A is a schematic of a relation of the arrangement of the filters of respective colors in the color filter, the scattering axis directions of the anisotropic scattering member, and the main viewing angle direction of the liquid-crystal panel. FIG. 13B is a schematic of a relation of the arrangement of the filters of respective colors in a color filter, the scattering axis directions of the anisotropic scattering member, and the main viewing angle direction of the liquid-crystal panel according to a comparative example. In the color filter 22, the extending directions of the boundaries of the filter 22R, the filter 22B, and the filter 22G are in the same direction as the main viewing angle direction 93 of the liquid-crystal panel PL and the scattering axis directions 90 and 92 when viewed from the Z-direction, as illustrated in FIG. 13A. By arranging the filters like the color filter 22, the reflective LCD device 1 can reduce a change in the transmittance in the main viewing angle direction 93 of the liquid-crystal panel PL and the scattering axis directions 90 and 92 compared with the case of a color filter 98 illustrated in FIG. 13B. In the color filter 98, the extending directions of the boundaries of the filter 22R, the filter 22B, and the filter 22G are in a direction orthogonal to the main viewing angle direction 93 of the liquid-crystal panel PL and the scattering axis directions 90 and 92 when viewed from the Z-direction.

The color filter 22 is arranged in an orientation in which the extending directions of the boundaries 94 are in the same direction as the main viewing angle direction 93 of the liquid-crystal panel PL and the scattering axis directions 90 and 92 when viewed from the Z-direction. Accordingly, the filters 22R, the filters 22G, and the filters 22B of the respective colors each align in the main viewing angle direction 93 of the liquid-crystal panel PL and the scattering axis directions 90 and 92, thereby making the transmittance of the color filter 22 uniform. Thus, the main viewing angle direction 93 of the liquid-crystal panel PL and the scattering axis directions 90 and 92 are the direction in which the transmittance varies the least in the entire color filter 22.

As described above, the direction in which the transmittance varies the least in one pixel in the color filter 22 is the same direction as the main viewing angle direction 93 of the liquid-crystal panel PL in the reflective LCD device 1 when viewed from the Z-direction. This configuration can prevent the boundaries of the filters from being arranged in the main viewing angle direction 93, which is a light incident direction that makes a blur conspicuous, with the anisotropic scattering member 27. This can make a blur occurring between the filters of different colors inconspicuous. Thus, the reflective LCD device 1 according to the present disclosure can reduce a blur in an image and directional dependence of light, thereby increasing the visibility. Arrangement of a scattering member, which is the anisotropic scattering member 27 in the present embodiment, can widen the viewing angle of an image.

In the reflective LCD device 1, the direction in which the transmittance varies the least in one pixel in the color filter 22 is the same direction as the scattering axis directions 90 and 92 of the anisotropic scattering member 27 when viewed from the Z-direction. This configuration can prevent the boundaries of the filters from being arranged in the scattering axis directions 90 and 92, which are directions in which the anisotropic scattering member 27 scatters light more. This can make a blur occurring between the filters of different colors inconspicuous. Thus, the reflective LCD device 1 according to the present disclosure can reduce a blur in an image and the directional dependence of light, thereby increasing the visibility.

In the reflective LCD device 1, the scattering axis directions 90 and 92 of the anisotropic scattering sheets 271 and 272, respectively, included in the anisotropic scattering member 27 are the same direction. In other words, the anisotropic scattering member 27 does not laminate anisotropic scattering sheets having different scattering axis directions and use a predetermined direction as the scattering axis direction. The anisotropic scattering member 27 defines the scattering axis directions 90 and 92 as a single predetermined direction and uses the predetermined direction as the scattering axis direction of the entire anisotropic scattering member 27. As a result, the reflective LCD device 1 can scatter light more in the main viewing angle direction (direction in which the transmittance of the color filter 22 varies the least) and suppress scattering of light in a direction (direction in which the transmittance of the color filter varies) orthogonal to the main viewing angle direction. By making the scattering axis directions 90 and 92 of all the anisotropic scattering sheets 271 and 272 included in the anisotropic scattering member 27 the same direction, it is possible to further reduce a blur in an image.

In the reflective LCD device 1, the anisotropic scattering member 27 (anisotropic scattering sheets 271 and 272) is provided between the second substrate 23 and the polarizing plate 26. More specifically, the anisotropic scattering member 27 is provided between the second substrate 23 and the quarter-wave plate 24. With this configuration, the second substrate 23 and the anisotropic scattering member 27 can be provided adjacent to each other without the polarizing plate 26, the quarter-wave plate 24, and the half-wave plate 25 interposed therebetween. Because the second substrate 23 and the anisotropic scattering member 27 are in contact with each other, light output from the second substrate 23 can be directly incident on the anisotropic scattering member 27. This makes the light output from the second substrate 23 hard to spread out in the display surface of the reflective LCD device 1, thereby reducing a blur in an image displayed on the display surface.

In the reflective LCD device 1, the scattering axis directions 90 and 92 of the anisotropic scattering member 27 and the main viewing angle direction 93 of the liquid-crystal panel PL can be the same direction when viewed from the Z-direction. This enables the anisotropic scattering member 27 to scatter light exiting from the second substrate 23 in the main viewing angle direction 93 and incident on the anisotropic scattering member 27. The anisotropic scattering member 27 can reduce light exiting in a predetermined direction without being scattered. This can reduce the directional dependence of light exiting from the anisotropic scattering member 27. Thus, the reflective LCD device 1 according to the present disclosure can reduce a blur in an image and the directional dependence of light, thereby increasing the visibility.

1-8. Front Light Unit

Figure 14A:
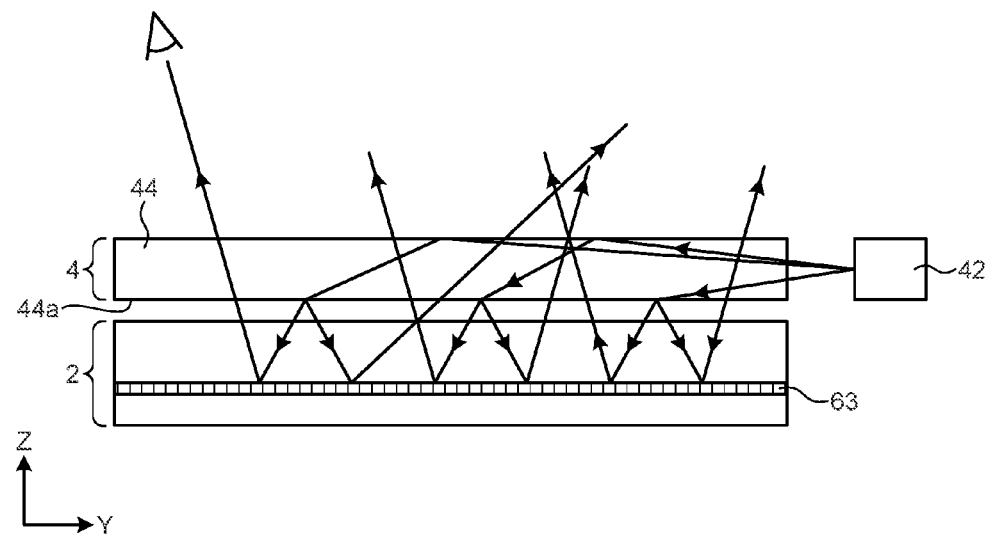
FIG. 14A is a view for explaining a function of a front light unit.
Figure 14B:
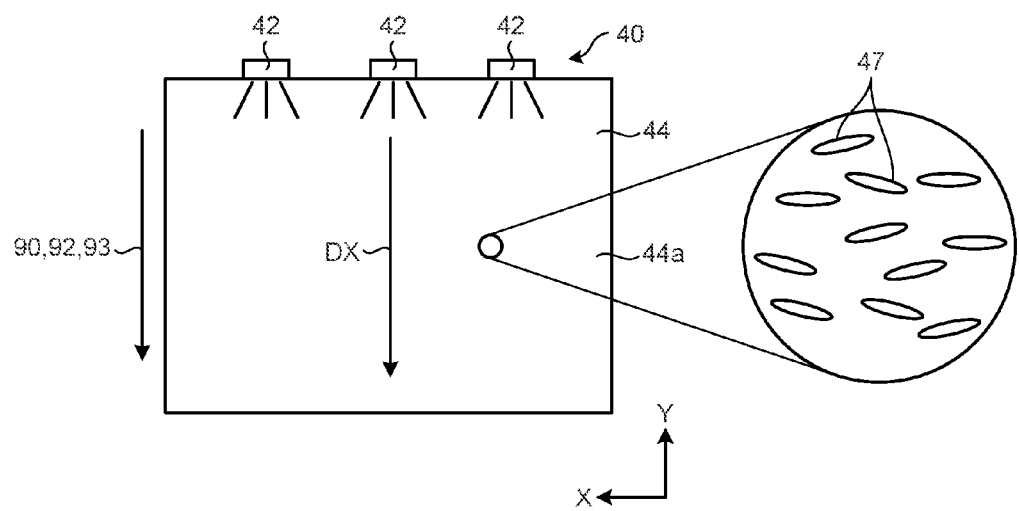
FIG. 14B is another view for explaining a function of a front light unit.
Figure 14C:
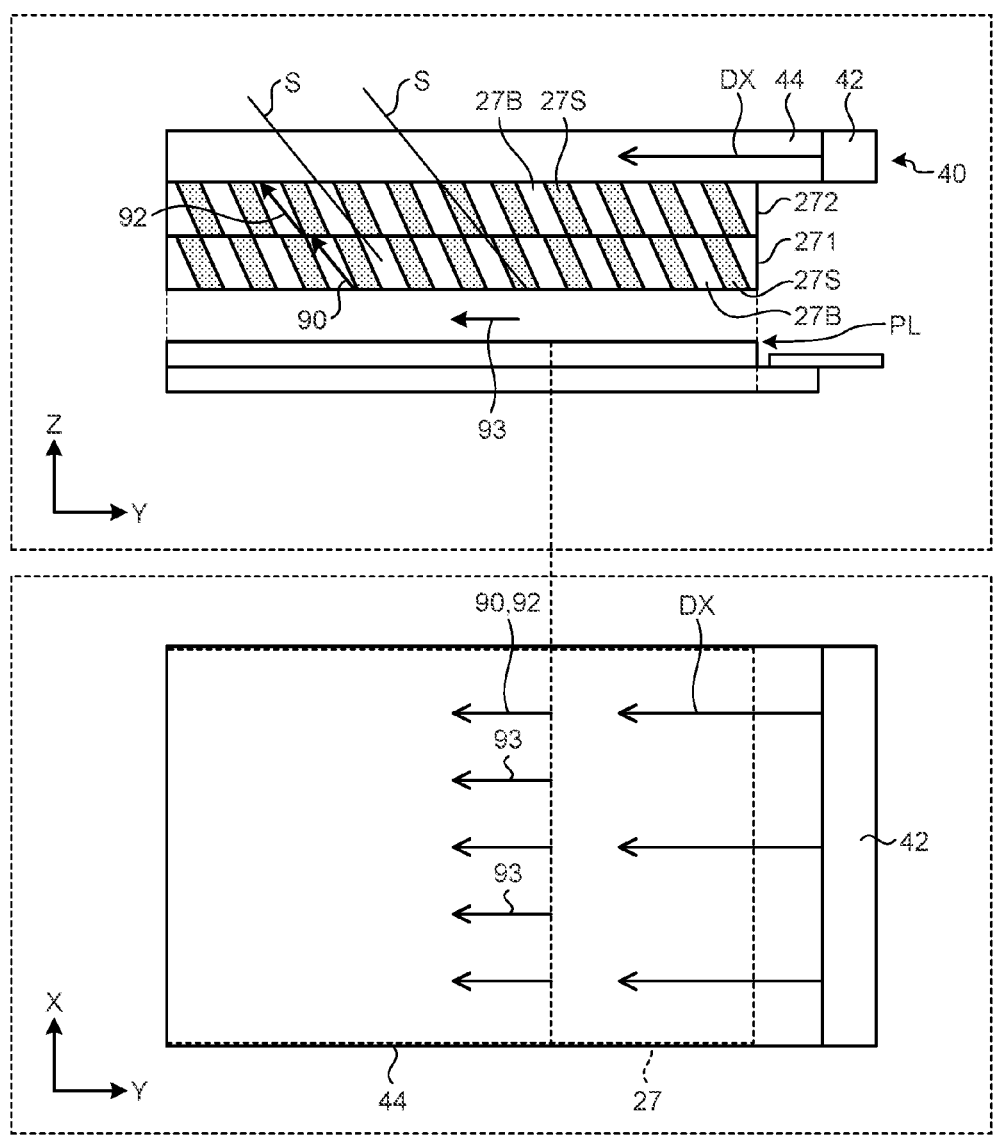
FIG. 14C is a schematic of a relation of the scattering axis directions of the anisotropic scattering member, the main viewing angle direction of the liquid-crystal panel, and a traveling direction of front light in a light guide plate.
Figure 14D:
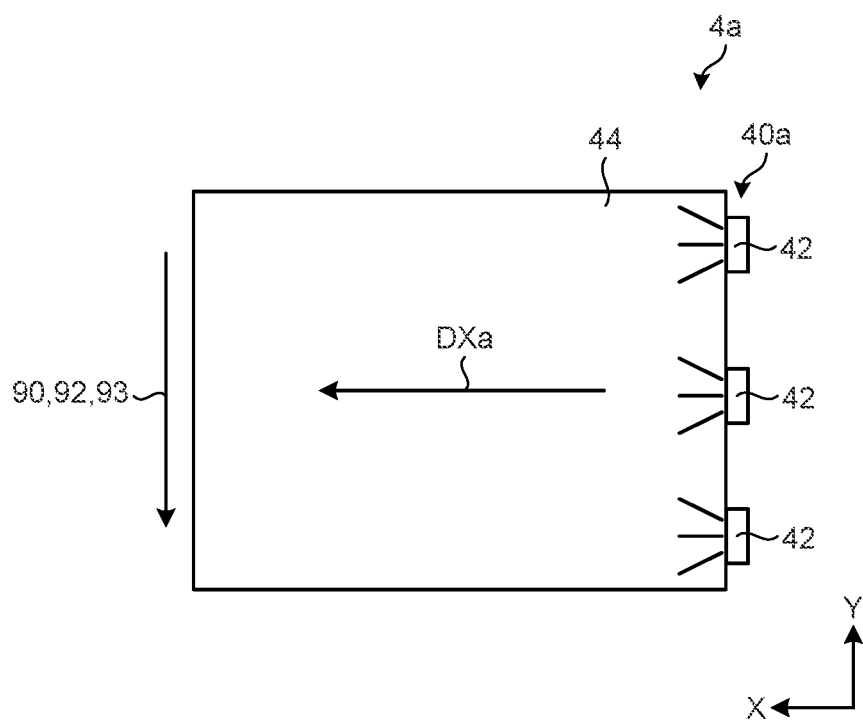
FIG. 14D is a view for explaining a function of a front light unit according to another example.

The front light unit 4 will now be described with reference to FIG. 1 and FIG. 14A to FIG. 14D. FIG. 14A is a view for explaining a function of the front light unit. FIG. 14B is another view for explaining a function of the front light unit. FIG. 14C is a schematic of a relation of the scattering axis directions of the anisotropic scattering member, the main viewing angle direction of the liquid-crystal panel, and a traveling direction of front light in the light guide plate. FIG. 14D is a view for explaining a function of a front light unit according to another example.

As illustrated in FIG. 1 and FIG. 14A, the front light unit 4 is arranged on the surface that displays an image of the reflective LCD panel 2, that is, the surface of the second substrate 23 on which external light is incident and from which light reflected by the reflective electrode 63 is output. The front light unit 4 includes the light source 40, the light guide plate 44, and an adhesive member 46. The front light unit 4 makes light that is output from the light source 40 incident on the reflective LCD panel 2 with the light guide plate 44.

As illustrated in FIG. 14B, the light source 40 includes a plurality of light emitting diodes (LEDs) 42. The LEDs 42 are arranged in a line in a manner facing one of the side surfaces of the light guide plate 44. While the present embodiment uses the LEDs 42 as the light source 40, another light source, such as a fluorescent tube, may be used.

The light guide plate 44 is a transparent plate-like member and is laminated on the surface (display surface) of the second substrate 23 of the reflective LCD panel 2. In the present embodiment, the light source 40 is arranged at a position facing one of the side surfaces on the end of the light guide plate 44 in the Y-direction. The light guide plate 44 covers the entire surface of the second substrate 23. The light guide plate 44 has a number of grooves 47 formed on a surface 44a facing the surface (display surface) of the second substrate 23. The groove 47 has a shape with an aspect ratio between the longitudinal direction and the short direction of larger than 1 viewed from a direction orthogonal to the surface 44a. The light guide plate 44 preferably has a larger number of grooves 47 formed at an angle between the longitudinal direction of the grooves 47 and a direction parallel to the side of the light guide plate 44 on which the light source 40 is provided of smaller than 45 degrees. In other words, the light guide plate 44 preferably has the grooves 47 formed so as to allow light output from the light source 40 to be incident on the surface of the grooves 47 in the longitudinal direction. The grooves 47 of the light guide plate 44 can be formed by nanoimprint. Formation of the grooves 47 of the light guide plate 44 by nanoimprint facilitates formation of the grooves 47 on the surface 44a. The method for forming the grooves 47 of the light guide plate 44 is not particularly restricted. The grooves 47 may be formed by a semiconductor etching process or machining. In the case where the light guide plate 44 is formed by injection molding, the grooves 47 are formed during the injection molding.

The adhesive member 46 is arranged between the surface 44a of the light guide plate 44 and the surface that displays an image of the reflective LCD panel 2, which is the polarizing plate 26 in the present embodiment, to bond the light guide plate 44 and the polarizing plate 26. The adhesive member 46 is a transparent adhesive. The adhesive member 46 bonds the surface 44a of the light guide plate 44 and the polarizing plate 26 with no air layer interposed between the surface 44a of the light guide plate 44 and the polarizing plate 26. Because the adhesive member 46 is provided to bond the surface 44a of the light guide plate 44 and the polarizing plate 26 with no air layer interposed therebetween in the present embodiment, light can be output to the viewpoint more efficiently. It is preferable that no air layer be present between the surface 44a of the light guide plate 44 and the polarizing plate 26. Alternatively, an air layer may be present between the surface 44a of the light guide plate 44 and the polarizing plate 26 instead of the adhesive member 46.

As illustrated in FIG. 14A, the LEDs 42 of the light source 40 output light to the front light unit 4. The light thus output enters the light guide plate 44 from the end surface of the light guide plate 44. The light guide plate 44 guides the light entering the inside thereof in the Y-direction. If the light traveling in the light guide plate 44 reaches the side opposite to the surface 44a and the incident angle of the light is equal to or smaller than a predetermined angle, the light is reflected. If the light traveling in the light guide plate 44 reaches the surface 44a, the light is reflected and scattered by recesses and protrusions formed by the grooves 47 and is output toward the reflective LCD panel 2. The front light unit 4 has the grooves 47 formed on the surface 44a of the light guide plate 44 as described above. The front light unit 4 reflects and scatters light received from the light source 40, thereby outputting the light toward the reflective LCD panel 2. This can make the light incident on the reflective LCD panel 2 in the case where the front light unit 4 that outputs light is arranged on the display surface side of the reflective LCD panel 2.

The light output toward the reflective LCD panel 2 passes through the reflective LCD panel 2 and is reflected by the reflective electrode 63. The light then passes through the light guide plate 44 and reaches the eyes of an observer. The light output toward the reflective LCD panel 2 is switched between being blocked and not to be output and to be output depending on the state of the liquid crystal at a position where the light passes through the reflective LCD panel 2 as described above. Thus, an image is displayed on the display surface.

The following describes a traveling direction of the front light with reference to FIG. 14C. The upper figure of FIG. 14C is a side view of the front light unit 4 viewed in the X-direction, whereas the lower figure of FIG. 14C is a plan view of the front light unit 4 viewed in the Z-direction. In FIG. 14C, the anisotropic scattering member 27, the liquid-crystal panel PL, and the front light unit 4 are separated from one another to facilitate understanding of the relation in various directions.

In the front light unit 4, a traveling direction DX of front light traveling in the light guide plate 44, the scattering axis directions 90 and 92, and the main viewing angle direction 93 of the liquid-crystal panel PL are the same direction (Y-direction) when viewed from the direction (Z-direction) in which the first substrate 14 and the light guide plate 44 face each other. As a result, the traveling direction DX of the front light traveling in the light guide plate 44 and the direction in which the transmittance of the color filter 22 varies the least, that is, the direction in which the boundaries 94 extend in the color filter 22 are the same direction (Y-direction) viewed in the direction (Z-direction) in which the first substrate 14 and the light guide plate 44 face each other. The scattering axis directions 90 and 92 and the main viewing angle direction 93 of the liquid-crystal panel PL are inclined to the side opposite to the LEDs 42 of the front light unit 4 with respect to the normal direction of the display surface. The traveling direction DX of the front light, the scattering axis directions 90 and 92, and the main viewing angle direction 93 of the liquid-crystal panel PL are the same direction viewed in the Z-direction. The LEDs 42 may be provided on the opposite side of the light guide plate 44 in the Y-direction or on both sides of the light guide plate 44 in the Y-direction.

As described above, the reflective LCD device 1 can make the traveling direction DX of the front light traveling in the light guide plate 44 the same direction as the direction in which the transmittance of the color filter 22 varies the least viewed in the direction in which the first substrate 14 and the light guide plate 44 face each other. As a result, the traveling direction DX of the front light in which the light easily spreads out coincides with the direction in which the transmittance of the color filter 22 varies the least. This can make a blur hard to occur in an image. In other words, by arranging the boundaries 94 of the filters where the transmittance changes significantly along a direction in which the light is hard to spread out, it is possible to make a blur hard to occur at the boundaries 94. Specifically, an assumption is made that a light source 40a of a front light unit 4a is arranged on a side of the light guide plate 44 parallel to the scattering axis directions 90 and 92 and the main viewing angle direction 93 of the liquid-crystal panel PL when viewed from the Z-direction, as illustrated in FIG. 14D. The reflective LCD device 1 can reduce the luminance distribution of the front light in a direction orthogonal to the direction in which the transmittance of the color filter 22 varies the least compared with the case where a traveling direction Dxa of front light is set to a direction orthogonal to the scattering axis directions 90 and 92 and the main viewing angle direction 93 of the liquid-crystal panel PL as illustrated in FIG. 14D. This can make a blur hard to occur in an image.

The reflective LCD device 1 can make the traveling direction DX of the front light traveling in the light guide plate 44 the same direction as the scattering axis directions 90 and 92 viewed in the direction in which the first substrate 14 and the light guide plate 44 face each other. This enables the front light unit 4 to guide front light exiting from the light irradiation surface of the light guide plate 44 in a direction along the scattering axis directions 90 and 92. As a result, the reflective LCD device 1 can guide a large amount of front light traveling in the scattering axis directions 90 and 92, thereby efficiently increasing the luminance of scattered front light.

While the color filter 22 is arranged such that the direction in which the transmittance of the filters per pixel varies the least coincides with the main viewing angle direction in a direction parallel to the display surface in the present embodiment, the arrangement of the color filter 22 is not limited thereto. The color filter 22 simply needs to be arranged such that a change in the transmittance of the filters per pixel in the main viewing angle direction is smaller than a change in the transmittance of the filters per pixel in a direction orthogonal to the main viewing angle direction in the direction parallel to the display surface. This can reduce a change in the transmittance of the color filter in the main viewing angle direction in which a blur is likely to occur, thereby making a blur hard to occur.

Figure 15:
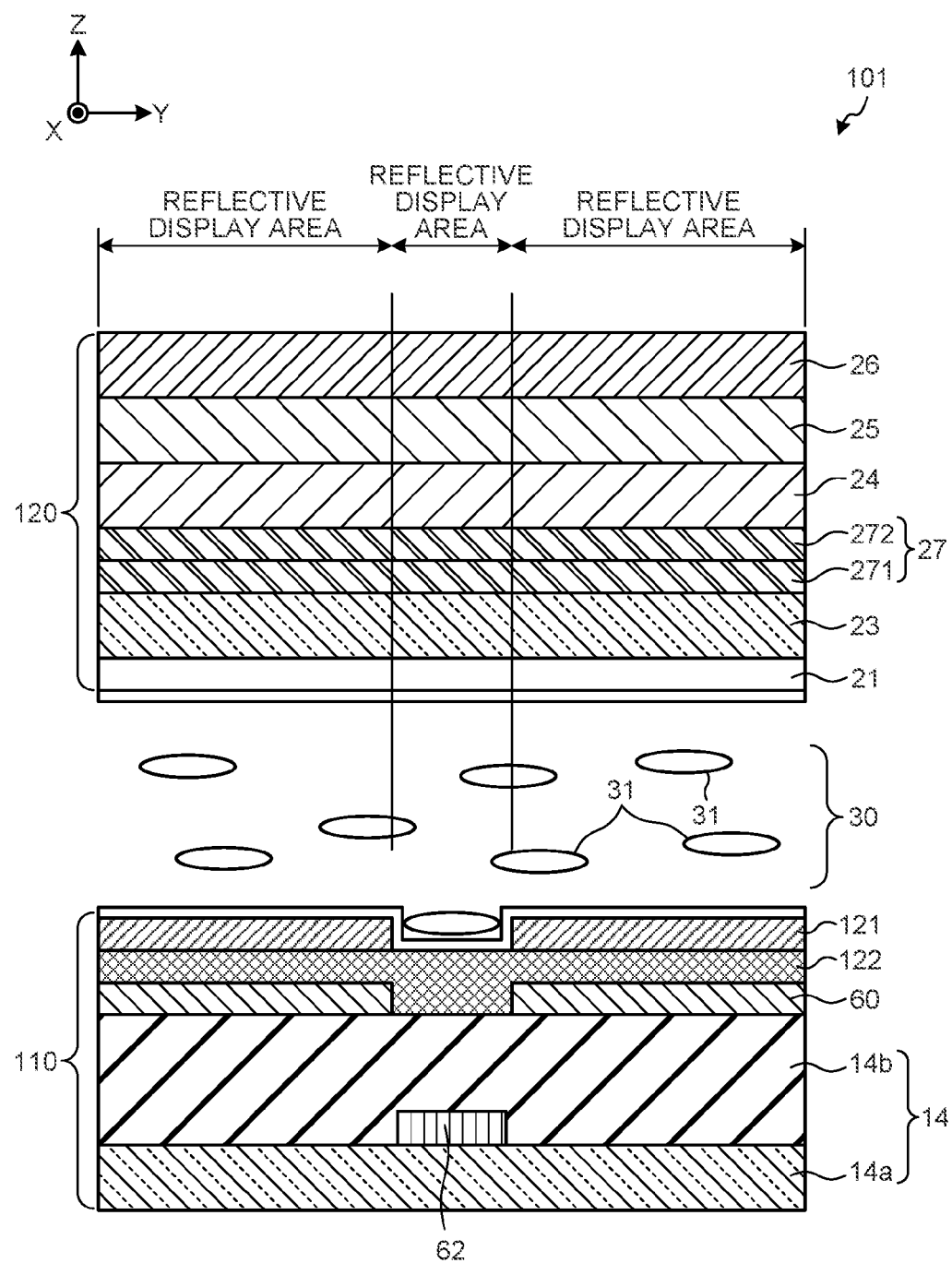
FIG. 15 is a sectional view of a sectional structure of two pixels adjacent to each other in the column direction of a reflective LCD device according to a modification.

The reflective LCD device 1 is provided with an anisotropic scattering member as a scattering member, thereby suitably scattering light in the main viewing angle direction as described above. While the reflective LCD device 1 is preferably provided with an anisotropic scattering member, a scattering member simply needs to be provided. The reflective LCD device 1 may be provided with an isotropic scattering member FIG. 15 is a sectional view of a sectional structure of two pixels adjacent to each other in the column direction of a reflective LCD device according to a modification. A reflective LCD device 101 illustrated in FIG. 15 has the same configuration as that of the reflective LCD device 1 except for the arrangement position of a color filter 122 and installation of a transparent electrode 121. In the reflective LCD device 101, the transparent electrode 121 and the color filter 122 are provided on the first substrate 14. Specifically, the color filter 122 is provided on the liquid-crystal layer 30 side of the reflective electrode 63 provided on the first substrate 14. The transparent electrode 121 is provided on the liquid-crystal layer 30 side of the color filter 122. The transparent electrode 121 is what is called a pixel electrode. The transparent electrode 121 is applied with a voltage by a pixel signal or the like, thereby forming an electric field between the transparent electrode 121 and the transparent electrode 21 serving as a common electrode (drive electrode). The color filter 122 is arranged between the transparent electrode 121 and the reflective electrode 63. The arrangement of filters of respective colors in the color filter 122 is the same as that of the color filter 22.

The reflective LCD device 101 is provided with the color filter 122 serving as an on chip color filter (OCCF) arranged on the first substrate 14, more specifically on the pixel electrode. The reflective LCD device 101 can reduce an influence of scattering of light passing through the color filter on an image, thereby further reducing a blur in an image.

Figure 16A:
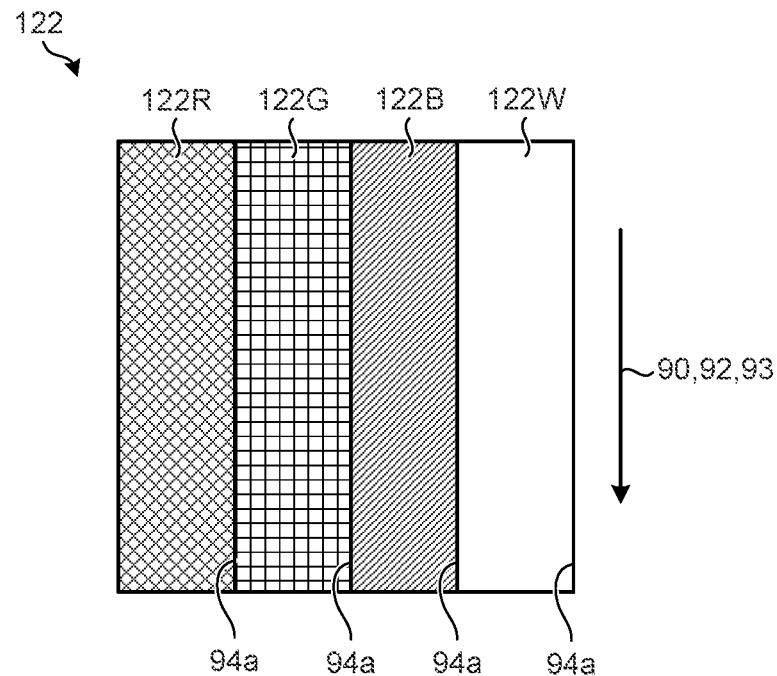
FIG. 16A is a schematic of a relation of the arrangement of filters of respective colors in a color filter, the scattering axis directions of the anisotropic scattering member, and the main viewing angle direction of the liquid-crystal panel.
Figure 16B:
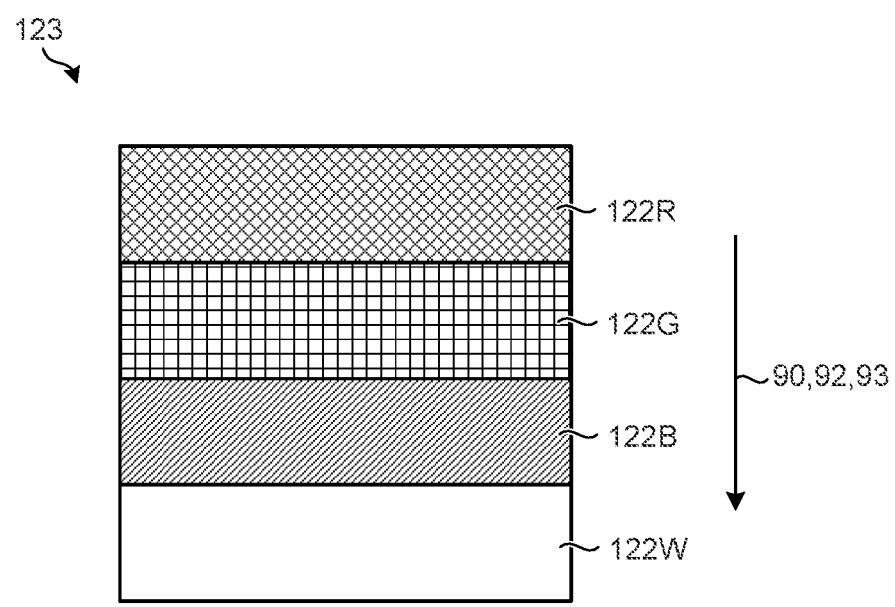
FIG. 16B is a schematic of a relation of the arrangement of filters of respective colors in a color filter, the scattering axis directions of the anisotropic scattering member, and the main viewing angle direction of the liquid-crystal panel according to a comparative example.

While the color filter 22 includes the filter 22R of R corresponding to the sub-pixel 50R that displays R, the filter 22B of B corresponding to the sub-pixel 50B that displays B, and the filter 22G of G corresponding to the sub-pixel 50G that displays G in the embodiment described above, the structure of the color filter is not limited thereto. FIG. 16A is a schematic of a relation of the arrangement of filters of respective colors in a color filter, the scattering axis directions of the anisotropic scattering member, and the main viewing angle direction of the liquid-crystal panel. FIG. 16B is a schematic of a relation of the arrangement of filters of respective colors in a color filter, the scattering axis directions of the anisotropic scattering member, and the main viewing angle direction of the liquid-crystal panel according to a comparative example.

The color filter 122 illustrated in FIG. 16A includes filters of four colors of a filter 122R of R (red), a filter 122B of B (blue), a filter 122G of G (green), and a filter 122W of W (white). In the reflective LCD device provided with the color filter 122, four sub-pixels constitute one pixel (a unit pixel).

In the color filter 122, the filter 122R, the filter 122B, the filter 122G, and the filter 122W included in one pixel are arranged in this order in a direction orthogonal to the main viewing angle direction 93 of the liquid-crystal panel PL and the scattering axis directions 90 and 92. As a result, the color filter 122 has boundaries 94a between the filters of different colors extending in the Y-axis direction. Also in the color filter 122, the extending directions of the boundaries 94a are in the same direction as the main viewing angle direction 93 of the liquid-crystal panel PL and the scattering axis directions 90 and 92 when viewed from the Z-direction.

In the color filter 122, the color filters corresponding to a plurality of sub-pixels constituting one pixel (a unit pixel) are aligned in the direction (X-axis direction) orthogonal to the main viewing angle direction 93 of the liquid-crystal panel PL and the scattering axis directions 90 and 92 when viewed from the Z-direction. As a result, the color filter 122 has any one of the filter 122R, the filter 122G, the filter 122B, and the filter 122W arranged in the main viewing angle direction 93 and the scattering axis directions 90 and 92 at any position in the X-axis direction in one pixel (a unit pixel). In the color filter 122, the main viewing angle direction 93 of the liquid-crystal panel PL and the scattering axis directions 90 and 92 are the direction in which the transmittance varies the least in one pixel (a unit pixel including a plurality of sub-pixels). By arranging the filters like the color filter 122, the reflective LCD device 1 can reduce a change in the transmittance in the main viewing angle direction 93 of the liquid-crystal panel PL and the scattering axis directions 90 and 92 compared with the case of a color filter 123 illustrated in FIG. 16B. In the color filter 123, the extending directions of the boundaries of the filter 122R, the filter 122B, the filter 122G, and the filter 122W are in a direction orthogonal to the main viewing angle direction 93 of the liquid-crystal panel PL and the scattering axis directions 90 and 92 when viewed from the Z-direction.

In the case where filters of four colors are used like the color filter 122, it is possible to provide advantageous effects similar to those described above by setting the main viewing angle direction 93 of the liquid-crystal panel PL and the scattering axis directions 90 and 92 to a direction in which the transmittance varies the least. While the filters of four colors are used in the embodiment, the same applies to filters of five or more colors or filters of two colors. The use of the filter 122W of a white filter can suitably prevent color mixture between filters adjacent to each other occurring along with a blur. This makes it possible to suitably display white light.

In the color filter 122, sub-pixels constituting one pixel and the filters of respective colors are aligned in a direction orthogonal to the main viewing angle direction 93 of the liquid-crystal panel PL when viewed from the Z-direction, as illustrated in FIG. 16A. This configuration can substantially eliminate a change in the transmittance in the main viewing angle direction 93 and suitably provide the advantageous effects described above. The arrangement of the filters is not limited thereto. In the color filter 122, the sub-pixels constituting one pixel and the filters of respective colors may be aligned both in a direction orthogonal to the main viewing angle direction 93 and in the main viewing angle direction 93 when viewed from the Z-direction.

Figure 17:
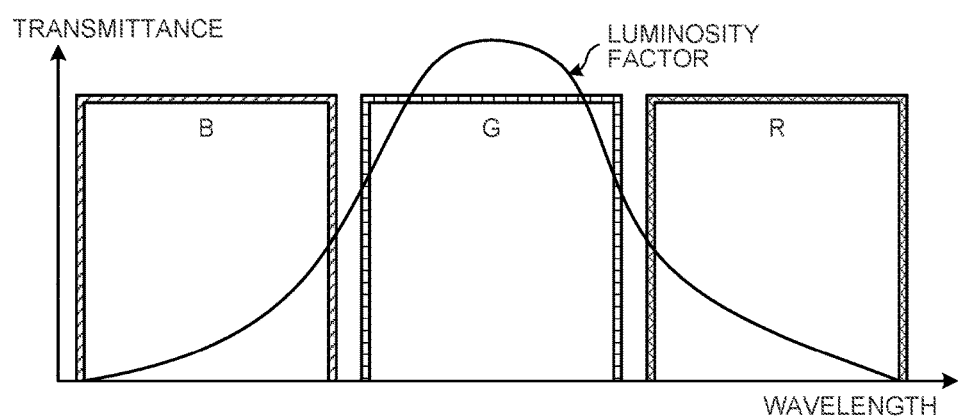
FIG. 17 is a diagram of a relation of the transmittance of the filters of respective colors in the color filter.

FIG. 17 is a diagram of a relation of the transmittance of the filters of respective colors in the color filter. The filter of R, the filter of G, and the filter of B preferably used for the color filter each transmit light within a predetermined wavelength range at predetermined transmittance. As illustrated in FIG. 17, the luminosity factor, which is an index of human sensitivity, is relatively high in the wavelength range of the filter of G and low in the wavelength range of the filter of R and the wavelength range of the filter of B. The transmittance used to compare the filters is a value obtained by multiplying transmittance by the luminosity factor. As a result, the transmittance of the filter of G is relatively high, whereas the transmittance of the filter of R and the filter of G is low out of the filter of R, the filter of G, and the filter of B. The filter of W transmits all the light of the filter of R, the filter of G, and the filter of B. Because the filter of W has high spectral transmittance and high luminosity factor, the filter of W has the highest transmittance.

Figure 18A:
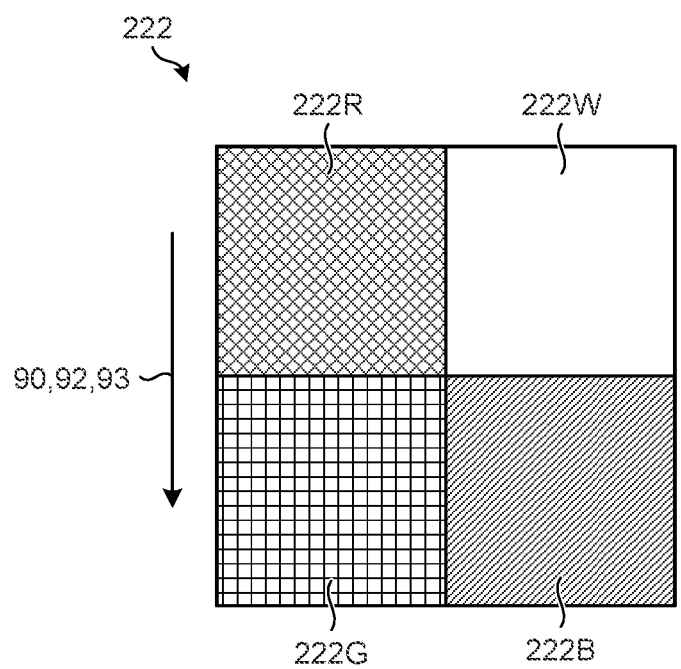
FIG. 18A is a schematic of a relation of the arrangement of filters of respective colors of a color filter, the scattering axis directions of the anisotropic scattering member, and the main viewing angle direction of the liquid-crystal panel.
Figure 18B:
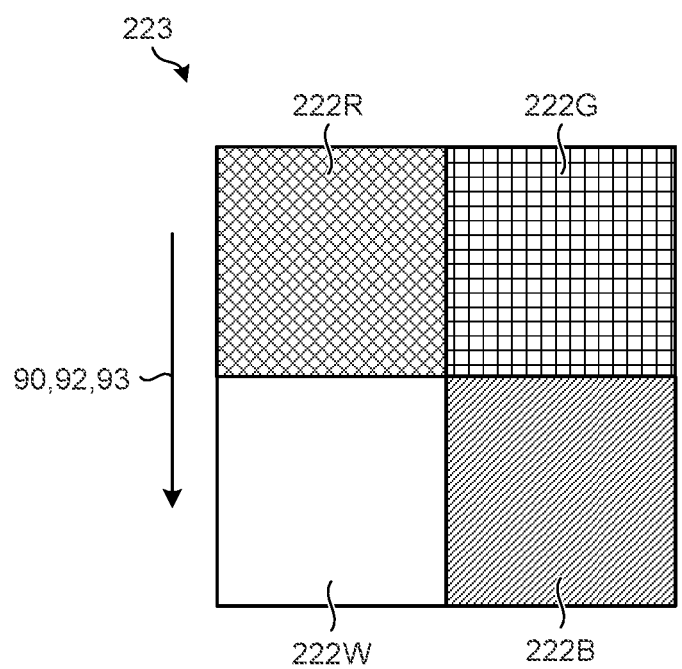
FIG. 18B is a schematic of a relation of the arrangement of filters of respective colors in a color filter, the scattering axis directions of the anisotropic scattering member, and the main viewing angle direction of the liquid-crystal panel.
Figure 18C:
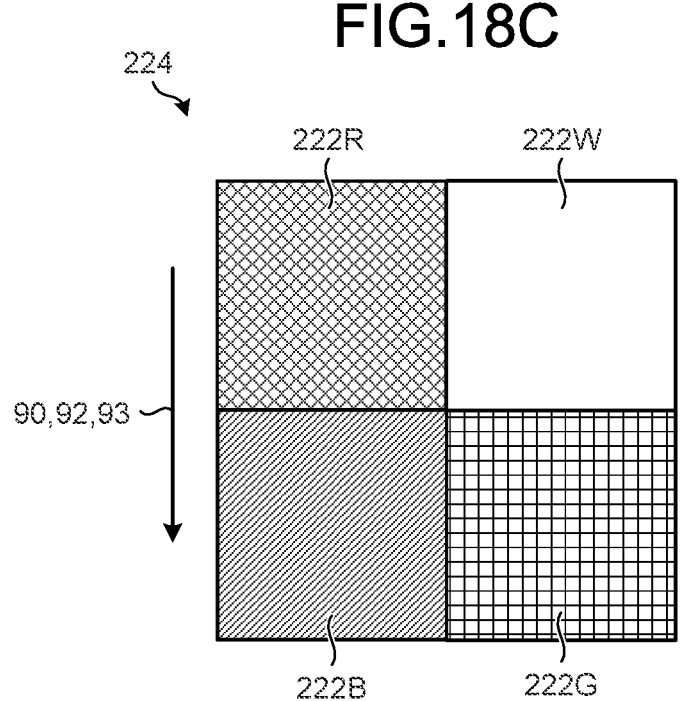
FIG. 18C is a schematic of a relation of the arrangement of filters of respective colors in a color filter, the scattering axis directions of the anisotropic scattering member, and the main viewing angle direction of the liquid-crystal panel.
Figure 18D:
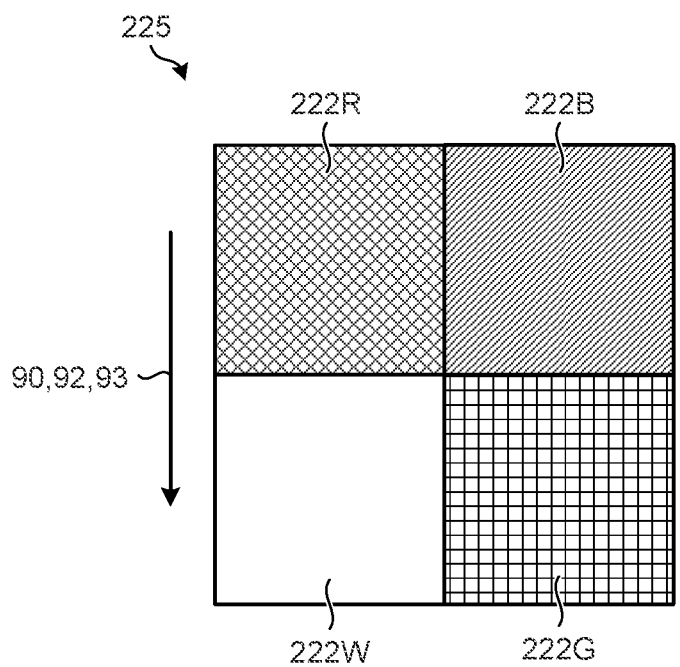
FIG. 18D is a schematic of a relation of the arrangement of filters of respective colors in a color filter, the scattering axis directions of the anisotropic scattering member, and the main viewing angle direction of the liquid-crystal panel according to a comparative example.

FIG. 18A to FIG. 18C are schematics of a relation of the arrangement of filters of respective colors of a color filter, the scattering axis directions of the anisotropic scattering member, and the main viewing angle direction of the liquid-crystal panel. FIG. 18D is a schematic of a relation of the arrangement of filters of respective colors of a color filter, the scattering axis directions of the anisotropic scattering member, and the main viewing angle direction of the liquid-crystal panel according to a comparative example. In these color filters, filters of respective colors are aligned both in a direction orthogonal to the main viewing angle direction 93 and in the main viewing angle direction 93 when viewed from the Z-direction, that is, the filters of respective colors are arranged in a matrix. In these cases as well, the color filters can provide the advantageous effects of suppression of a blur by setting the main viewing angle direction 93 of the liquid-crystal panel PL, more preferably, the main viewing angle direction 93 and the scattering axis directions 90 and 92 to a direction in which the transmittance varies the least (that is, a direction in which a change in the transmittance is the smallest). Each color filter simply needs to be arranged such that a change in the transmittance of the filters per pixel in the main viewing angle direction is smaller than a change in the transmittance of the filters per pixel in a direction orthogonal to the main viewing angle direction in a direction parallel to the display surface. This can reduce a change in the transmittance of the color filter in the main viewing angle direction in which a blur is likely to occur, thereby making a blur hard to occur.

A color filter 222 illustrated in FIG. 18A includes a filter 222R of R, a filter 222G of G, a filter 222B of B, and a filter 222W of W in an area corresponding to one pixel. In the color filter 222, the structure illustrated in FIG. 18A is two-dimensionally arrayed corresponding to each pixel. In the color filter 222, the filter 222R of R and the filter 222G of G are adjacent to each other, and the filter 222W of W and the filter 222B of B are adjacent to each other in the main viewing angle direction 93 of the liquid-crystal panel PL and the scattering axis directions 90 and 92 when viewed from the Z-direction. In the color filter 222, the filter 222R of R and the filter 222W of W are adjacent to each other, and the filter 222G of G and the filter 222B of B are adjacent to each other in the direction orthogonal to the main viewing angle direction 93 of the liquid-crystal panel PL and the scattering axis directions 90 and 92 when viewed from the Z-direction. By arranging the filters like the color filter 222, the main viewing angle direction 93 of the liquid-crystal panel PL coincides with the direction in which the transmittance varies the least (that is, the direction in which a change in the transmittance is the smallest).

A color filter 223 illustrated in FIG. 18B includes the filter 222R of R, the filter 222G of G, the filter 222B of B, and the filter 222W of W in an area corresponding to one pixel. In the color filter 223, the structure illustrated in FIG. 18B is two-dimensionally arrayed corresponding to each pixel. In the color filter 223, the filter 222R of R and the filter 222W of W are adjacent to each other, and the filter 222G of G and the filter 222B of B are adjacent to each other in the main viewing angle direction 93 of the liquid-crystal panel PL and the scattering axis directions 90 and 92 when viewed from the Z-direction. In the color filter 223, the filter 222R of R and the filter 222G of G are adjacent to each other, and the filter 222W of W and the filter 222B of B are adjacent to each other in the direction orthogonal to the main viewing angle direction 93 of the liquid-crystal panel PL and the scattering axis directions 90 and 92 when viewed from the Z-direction. By arranging the filters like the color filter 223, the main viewing angle direction 93 of the liquid-crystal panel PL coincides with the direction in which the transmittance varies the least (that is, the direction in which a change in the transmittance is the smallest).

A color filter 224 illustrated in FIG. 18C includes the filter 222R of R, the filter 222G of G, the filter 222B of B, and the filter 222W of W in an area corresponding to one pixel. In the color filter 224, the structure illustrated in FIG. 18C is two-dimensionally arrayed corresponding to each pixel. In the color filter 224, the filter 222R of R and the filter 222B of B are adjacent to each other, and the filter 222W of W and the filter 222G of G are adjacent to each other in the main viewing angle direction 93 of the liquid-crystal panel PL and the scattering axis directions 90 and 92 when viewed from the Z-direction. In the color filter 224, the filter 222R of R and the filter 222W of W are adjacent to each other, and the filter 222B of B and the filter 222G of G are adjacent to each other in the direction orthogonal to the main viewing angle direction 93 of the liquid-crystal panel PL and the scattering axis directions 90 and 92 when viewed from the Z-direction. The color filter 224 can reduce a change in the transmittance in the main viewing angle direction 93, thereby providing the advantageous effects described above. In the color filter 224, the filter 222W of W and the filter 222G of G having similar transmittance are adjacent to each other in the main viewing angle direction 93 of the liquid-crystal panel PL and the scattering axis directions 90 and 92 when viewed from the Z-direction. If the observer changes the angle of observation, a change in the transmittance in the main viewing angle direction 93 may possibly be made larger than a change in the transmittance in the direction orthogonal to the main viewing angle direction 93 in a pixel, thereby making a blur likely to occur. As a result, a blur is more likely to occur in the color filter 224 than in the color filter 222 of FIG. 18A and the color filter 223 of FIG. 18B.

A color filter 225 illustrated in FIG. 18D includes the filter 222R of R, the filter 222G of G, the filter 222B of B, and the filter 222W of W in an area corresponding to one pixel. In the color filter 225, the structure illustrated in FIG. 18D is two-dimensionally arrayed corresponding to each pixel. In the color filter 225, the filter 222R of R and the filter 222W of W are adjacent to each other, and the filter 222B of B and the filter 222G of G are adjacent to each other in the main viewing angle direction 93 of the liquid-crystal panel PL and the scattering axis directions 90 and 92 when viewed from the Z-direction. In the color filter 225, the filter 222R of R and the filter 222B of B are adjacent to each other, and the filter 222W of W and the filter 222G of G are adjacent to each other in the direction orthogonal to the main viewing angle direction 93 of the liquid-crystal panel PL and the scattering axis directions 90 and 92 when viewed from the Z-direction. In the color filter 225, the filter 222W of W and the filter 222G of G having similar transmittance are adjacent to each other in the direction orthogonal to the main viewing angle direction 93 and the scattering axis directions 90 and 92 when viewed from the Z-direction. As a result, a change in the transmittance in the main viewing angle direction 93 may possibly be made larger than a change in the transmittance in the direction orthogonal to the main viewing angle direction 93 in a pixel. As a result, the color filter 225 fails to provide the advantageous effects described above.

The color filter is preferably provided with a light blocking portion between color filters included in one pixel. Specifically, the light blocking portion is preferably provided between the filter of W and a filter of another color adjacent to each other in the direction orthogonal to the main viewing angle direction 93 of the liquid-crystal panel PL and the scattering axis directions 90 and 92 when viewed from the Z-direction. The reflective LCD device is preferably provided with a spacer at a position overlapping with the light blocking portion when viewed from a direction orthogonal to the display surface. The spacer is arranged in the liquid-crystal layer. The spacer is a mechanism that suppresses deflection of the substrate to maintain the space of the liquid-crystal layer.

Figure 19A:
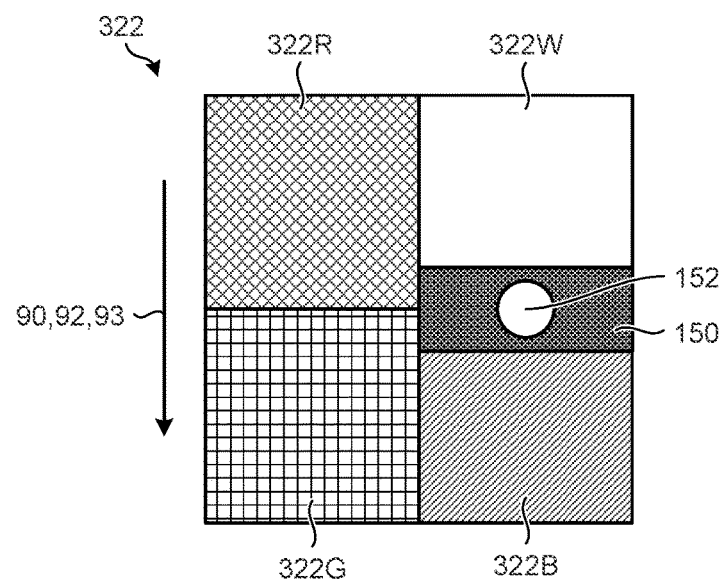
FIG. 19A is a schematic of a relation of a color filter, a spacer, the scattering axis directions of the anisotropic scattering member, and the main viewing angle direction of the liquid-crystal panel.
Figure 19B:
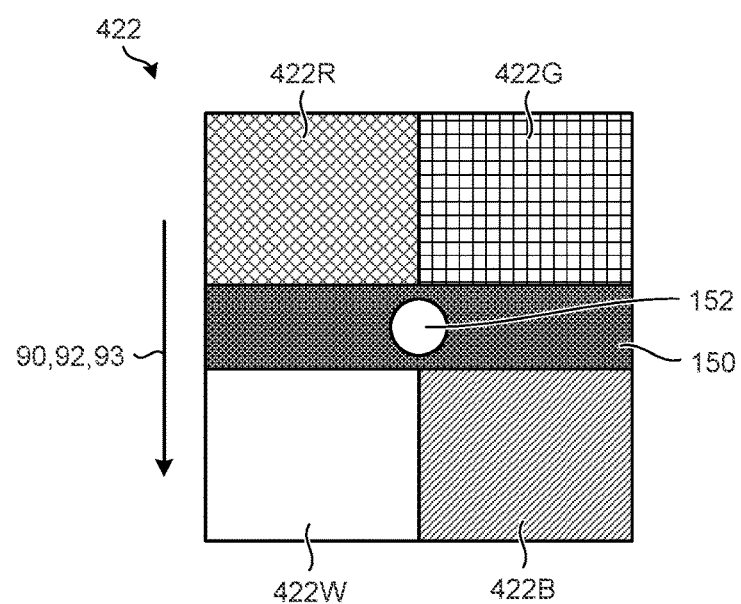
FIG. 19B is a schematic of a relation of a color filter, a spacer, the scattering axis directions of the anisotropic scattering member, and the main viewing angle direction of the liquid-crystal panel.

FIG. 19A and FIG. 19B are schematics of a relation of a color filter, a spacer, the scattering axis directions of the anisotropic scattering member, and the main viewing angle direction of the liquid-crystal panel. A color filter 322 illustrated in FIG. 19A includes a filter 322R of R, a filter 322G of G, a filter 322B of B, a filter 322W of W, and a light blocking portion 150 in an area corresponding to one pixel. In the color filter 322, the structure illustrated in FIG. 19A is two-dimensionally arrayed corresponding to each pixel. In the color filter 322, the filter 322R of R, the filter 322G of G, the filter 322B of B, and the filter 322W of W are arranged in the same relation as that of the color filter 222 illustrated in FIG. 18A. In the color filter 322, the light blocking portion 150 is arranged between the filter 322W of W and the filter 322B of B. In the color filter 322, the filter 322W of W and the filter 322B of B, which is a filter of another color, are adjacent to each other in the main viewing angle direction 93 of the liquid-crystal panel PL with the light blocking portion 150 interposed therebetween when viewed from the Z-direction. A spacer 152 is arranged at a position overlapping with the light blocking portion 150. This can more reliably reduce color mixture between white and another color in the main viewing angle direction, thereby reducing an influence of the spacer 152 on an image.

A color filter 422 illustrated in FIG. 19B includes a filter 422R of R, a filter 422G of G, a filter 422B of B, a filter 422W of W, and a light blocking portion 150 in an area corresponding to one pixel. In the color filter 422, the structure illustrated in FIG. 19B is two-dimensionally arrayed corresponding to each pixel. In the color filter 422, the filter 422R of R, the filter 422G of G, the filter 422B of B, and the filter 422W of W are arranged in the same relation as that of the color filter 223 illustrated in FIG. 18B. In the color filter 422, the light blocking portion 150 is arranged between the filter 422W of W and the filter 422R of R and between the filter 422G of G and the filter 422B of B. In the color filter 422, all the filters adjacent to each other in the main viewing angle direction 93 of the liquid-crystal panel PL are adjacent to each other with the light blocking portion 150 interposed therebetween when viewed from the Z-direction. A spacer 152 is arranged at a position overlapping with the light blocking portion 150. This can more reliably reduce color mixture between white and another color in the main viewing angle direction and color mixture between other colors, thereby reducing an influence of the spacer 152 on an image.

1-9. Transflective LCD Device Supporting Color Display

The display device according to the present disclosure is not limited to the reflective LCD device described above. As described above, the present disclosure is applicable to a transflective display device having both characteristics of a transmissive display device and a reflective display device. The following describes a transflective LCD device supporting color display as an example of the display device to which the present disclosure is applied with reference to the accompanying drawings.

Figure 20:
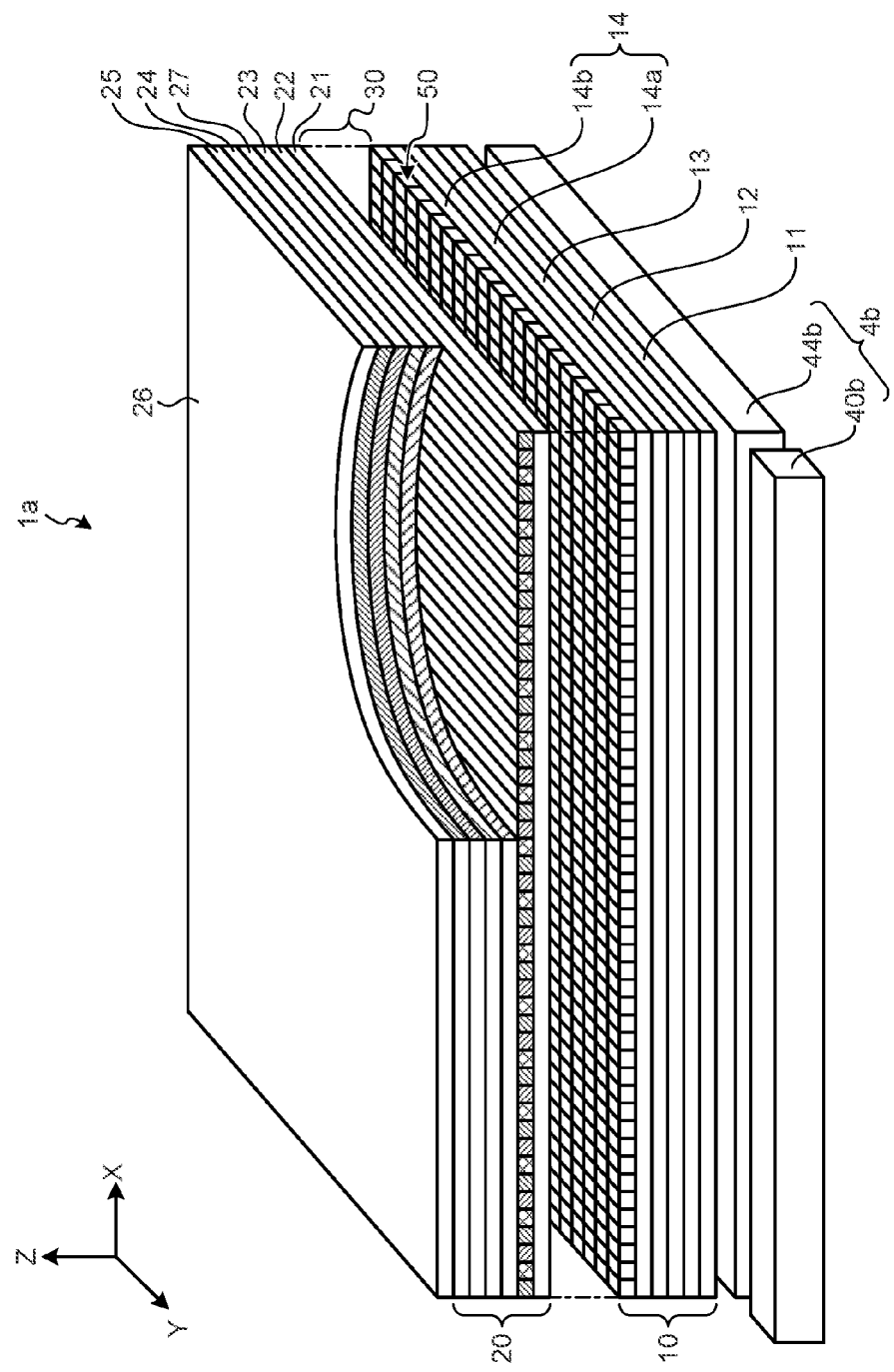
FIG. 20 is a perspective view schematically illustrating a configuration of the transflective LCD device to which the present disclosure is applied with a part thereof cut out.

FIG. 20 is a perspective view schematically illustrating a configuration of the transflective LCD device supporting color display to which the present disclosure is applied with a part thereof cut out.

As illustrated in FIG. 20, a transflective LCD device 1a to which the present disclosure is applied includes a first panel unit 10, a second panel unit 20, a liquid-crystal layer 30, and a backlight unit 4b as main components. The surface of the second panel unit 20 serves as a display surface of the transflective LCD device 1a. The first panel unit 10 and the second panel unit 20 are arranged in a manner facing each other with a predetermined gap interposed therebetween. By sealing the gap between the first panel unit 10 and the second panel unit 20 with a liquid-crystal material, the liquid-crystal layer 30 is formed. The transflective LCD device 1a according to the present embodiment is provided with the backlight unit 4b that makes light incident on the liquid-crystal panel from the side closer to the reflective electrode than the liquid-crystal layer, that is, from the first substrate side, instead of a front light unit that makes light incident on the liquid-crystal panel from the side closer to the transparent electrode than the liquid-crystal layer, that is, from the second substrate side.

The first panel unit 10 includes a polarizing plate 11, a half-wave plate 12, a quarter-wave plate 13, and a first substrate 14 arranged in this order from the side opposite to the liquid-crystal layer 30, that is, from the backlight unit 4b side. The first substrate 14 is provided with a circuit board 14a and a planarizing film 14b. The circuit board 14a is made of a substrate material including transparent glass.

The first panel unit 10 is provided with a plurality of signal lines and a plurality of scanning lines, to be described later, formed on the circuit board 14a in a manner intersecting with each other. Sub-pixels (hereinafter, which may be simply referred to as "pixels") 50 are two-dimensionally arranged in a matrix at portions where the signal lines and the scanning lines intersect with each other.

Circuit elements including switching elements and capacitive elements, such as thin film transistors (TFT), are formed on the circuit board 14a for the respective pixels 50. The planarizing film 14b is formed on the surface of the circuit elements, the signal lines, and the scanning lines, thereby planarizing the surface of the first panel unit 10. Reflective electrodes, which will be described later, are formed on the planarizing film 14b for the respective pixels 50. Because the circuit elements including the TFTs are formed on the first substrate 14, the first substrate 14 may be referred to as a TFT substrate.

The signal lines are wiring that transmits a signal (a display signal or a video signal) for driving the pixels 50. The signal lines have a wiring structure extending along an arrangement direction of pixels of pixel columns, that is, along a column direction (Y-direction in FIG. 20) for the respective pixel columns with respect to the matrix arrangement of the pixels 50. The scanning lines are wiring that transmits a signal (a scanning signal) for selecting the pixels 50 row by row. The scanning lines have a wiring structure extending along an arrangement direction of pixels of pixel rows, that is, along a row direction (X-direction in FIG. 20) for the respective pixel rows with respect to the matrix arrangement of the pixels 50. The X-direction and the Y-direction are orthogonal to each other.

The second panel unit 20 includes a transparent electrode 21 made of an indium tin oxide (ITO) and the like, a color filter 22, a second substrate 23 made of a substrate material including transparent glass, a quarter-wave plate 24, a half-wave plate 25, and a polarizing plate 26 arranged in this order from the liquid-crystal layer 30 side. An anisotropic scattering member 27 is provided between the second substrate 23 and the quarter-wave plate 24 in the second panel unit 20. The anisotropic scattering member 27 includes the two laminated anisotropic scattering sheets 271 and 272.

In the second panel unit 20, the color filter 22 has a structure in which filters in stripes of red (R), green (G), and blue (B) extending in the column direction (Y-direction) are repeatedly arranged at the same pitch as that of the pixels 50 in the row direction (X-direction), for example. Because the second substrate 23 includes the color filter (CF) 22, the second substrate 23 may be referred to as a CF substrate.

A transflective LCD panel is formed of the first panel unit 10, the second panel unit 20 arranged in a manner facing the first panel unit 10, and the liquid-crystal layer 30 arranged between the first panel unit 10 and the second panel unit 20. The top surface (surface) of the second panel unit 20 serves as the display surface.

The backlight unit 4b is an illuminating unit that illuminates the LCD panel from the back side of the LCD panel, that is, from the side opposite to the liquid-crystal layer 30 of the first panel unit 10. The configuration and the components of the backlight unit 4b are not particularly restricted. The backlight unit 4b includes, for example, a light source 40b incorporating a light-emitting diode (LED), a fluorescent tube, or the like, and also includes a light guide plate 44b. A well-known member, such as a prism sheet and a diffusion sheet, may be provided between the light guide plate 44b and the first panel unit 10. The backlight unit 4b provided to the transflective LCD device 1a according to the present embodiment is what is called an edge-light type illuminating unit.

In the transflective LCD device 1a having the configuration described above, the pixels 50 each have a reflective display area (a reflective display unit) and a transmissive display area (a transmissive display unit). The reflective display area includes the reflective electrode formed for each pixel 50 on the surface of the planarizing film 14b as described above. The reflective display area reflects external light passing through the second panel unit 20 and incident from the outside with the reflective electrode, thereby performing display with the reflected light.

1-4. Electrode Structure of a Pixel Unit

Before the explanation of the transmissive display area, an electrode structure of the pixel 50 will be described.

Figure 21A:
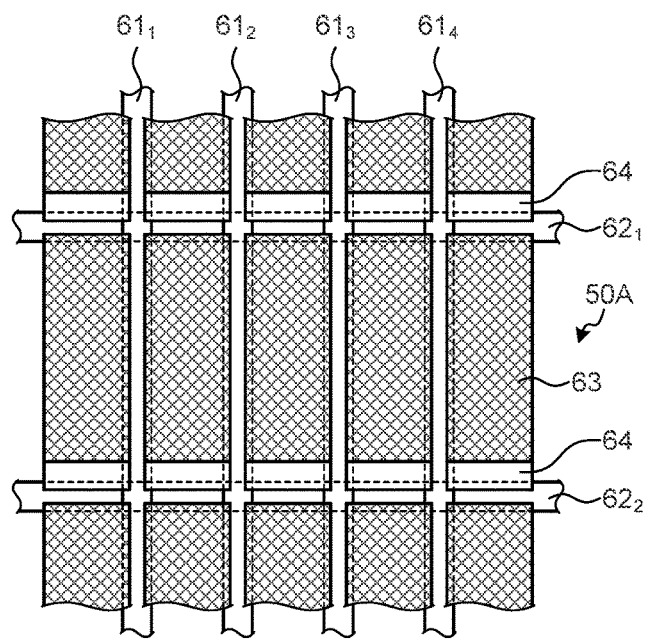
FIG. 21A is a plan view of a pixel unit of the transflective LCD device.

FIG. 21A is a view for explaining an electrode structure of a pixel unit. FIG. 21A is a plan view of the pixel unit of the transflective LCD device. In FIG. 21A, a reflective electrode 63 is indicated by hatching.

As illustrated in FIG. 21A, the pixel unit of the transflective LCD device 1a has the following configuration: the pixels 50 are arranged in a matrix; the signal lines 61 are arranged at spatial positions between the pixels 50 extending along the column direction in the matrix array; and the scanning lines 62 are arranged at spatial positions between the pixels 50 extending along the row direction. As described above, the signal lines 61 and the scanning lines 62 are arranged in a manner intersecting with each other on the circuit board 14a of the first panel unit 10 in FIG. 20.

In the pixel unit (pixel array unit) having such a configuration, the transflective LCD device 1a illustrated in FIG. 21A has the reflective electrode 63 made of a metal, such as aluminum, and an opening 64 in one pixel 50. The transflective LCD device 1a uses the opening 64 as the transmissive display area. Formation of the opening 64 in the pixel 50 to secure the transmissive display area reduces the reflective electrode 63, that is, the reflective display area in size by the area of the opening 64. This makes the reflective display performance of the transflective LCD device 1a lower than that of the reflective LCD device 1. In other words, securement of the transmissive display area and maintenance of the reflective display performance are in a trade-off relation.

Figure 21B:
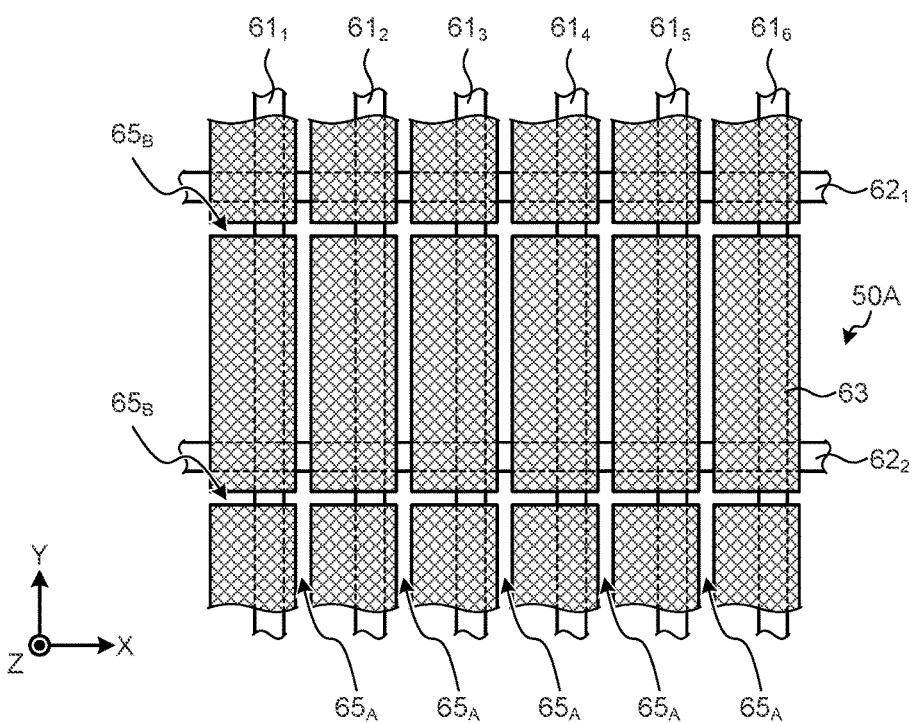
FIG. 21B is a plan view of a pixel unit of the transflective LCD device according to another example.

While the opening 64 is formed in the reflective electrode 63 in the present embodiment, the signal lines 61 and the scanning lines 62 may be arranged at positions deviated from the spaces $65_A$ and $65_B$ between the reflective electrodes 63, that is, at the back of the reflective electrodes 63 as illustrated in FIG. 21B. In this case, the spaces $65_A$ and $65_B$ between the reflective electrodes 63 serve as openings.

Figure 22:
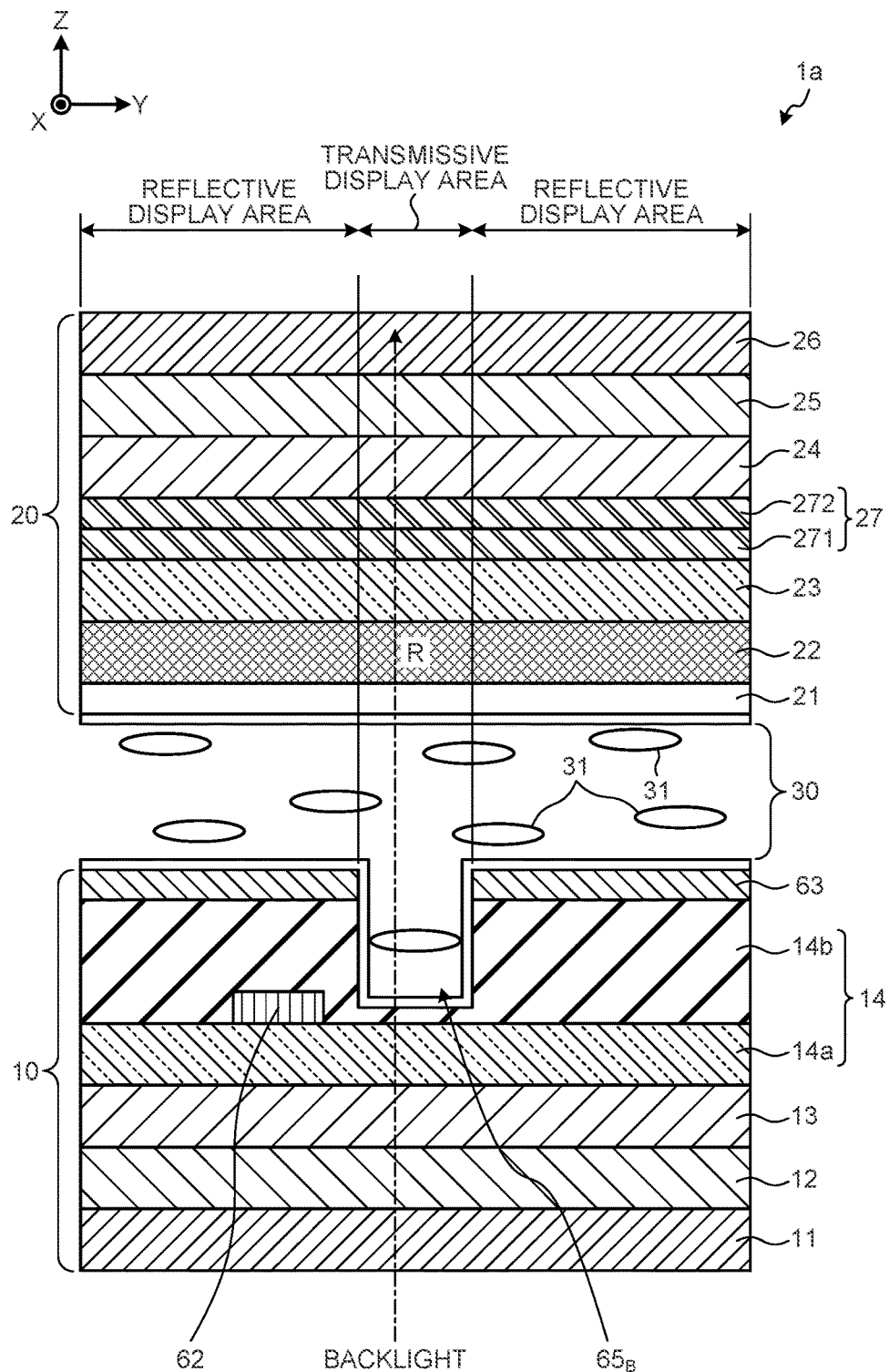
FIG. 22 is a sectional view of a sectional structure of two pixels adjacent to each other in the column direction of the transflective LCD device.

As illustrated in FIG. 22, the transflective LCD device 1a includes the sheet-like anisotropic scattering member 27 that scatters light. The anisotropic scattering member 27 is arranged on the downstream of the liquid-crystal layer 30 containing liquid-crystal molecules 31 in a traveling direction of light reflected by the reflective electrode 63. More specifically, the transflective LCD device 1a is provided with the anisotropic scattering member 27 between the second substrate 23 and the quarter-wave plate 24. The anisotropic scattering member 27 is an anisotropic or isotropic layer that scatters light reflected by the reflective electrode 63 and backlight passing through a space $65_B$ between the pixels. The anisotropic scattering member 27 includes the two laminated anisotropic scattering sheets 271 and 272. A light control film (LCF) may be used as the anisotropic scattering sheets 271 and 272 of the anisotropic scattering member 27, for example. The anisotropic scattering member 27 includes the laminated anisotropic scattering sheets 271 and 272 having similar functions. The transflective LCD device 1a uses the area in which the reflective electrode 63 is arranged as the reflective display area and uses the area between the reflective electrodes 63 as a transmissive display area.

Figure 23A:
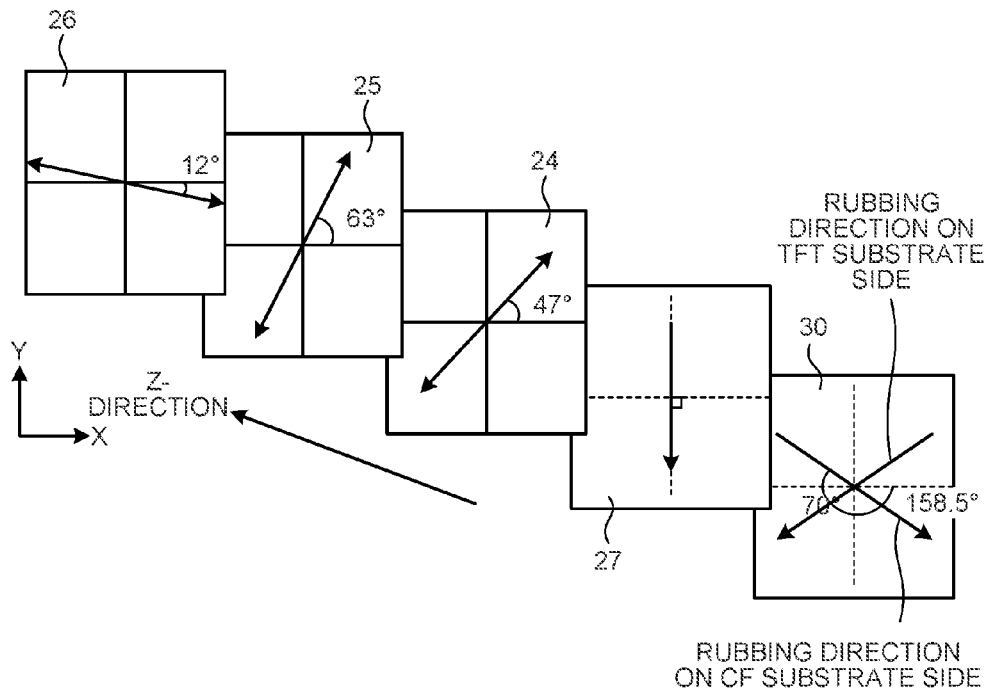
FIG. 23A is a schematic of an example of optical design on the CF substrate side of the transflective LCD device.
Figure 23B:
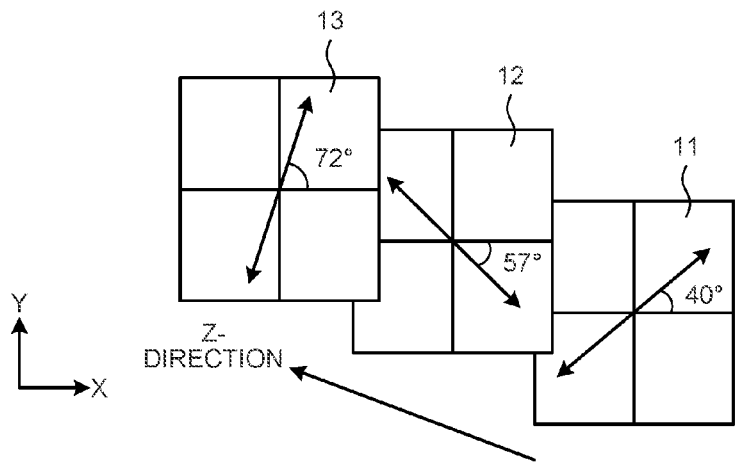
FIG. 23B is a schematic of an example of optical design on the TFT substrate side of the transflective LCD device.

FIG. 23A is a schematic of an example of optical design on the CF substrate side of the transflective LCD device. FIG. 23B is a schematic of an example of optical design on the TFT substrate side of the transflective LCD device. FIG. 23A and FIG. 23B illustrate axial directions of components of the first panel unit 10, the liquid-crystal cell (liquid-crystal layer 30), and components of the second panel unit 20. Specifically, FIG. 23B illustrates the axial directions of the first panel unit 10 (TFT substrate), including an absorption axis direction of the polarizing plate 11, a stretching axis direction of the half-wave plate 12 of 260 nm in thickness, and a stretching axis direction of the quarter-wave plate 13 of 140 nm in thickness. FIG. 23A illustrates the axial directions of the second panel unit 20 (CF substrate), including rubbing directions of the liquid-crystal cell of 200 nm in thickness on the TFT substrate side and the CF substrate side, a slow axis direction of the anisotropic scattering member 27, a stretching axis direction of the quarter-wave plate 24 of 110 nm in thickness, a stretching axis direction of the half-wave plate 25 of 260 nm in thickness, and an absorption axis direction of the polarizing plate 26.

Similarly to the reflective LCD device 1, the transflective LCD device 1a has a relation between the arrangement of filers of the color filter and the main viewing angle direction, a relation between the arrangement of filers of the color filter and the scattering axis of the anisotropic scattering member 27, and other relations satisfying the relations described above. Thus, the transflective LCD device 1a can reduce a blur in an image and display a higher quality image.

The LCD devices according to the embodiments are provided with an LCD panel using a drive technology of a vertical electric field mode, such as twisted nematic (TN) mode, vertical alignment (VA) mode, and electrically controlled birefringence (ECB) mode, in which a pixel electrode and a common electrode (a drive electrode) are arranged with a liquid-crystal layer interposed therebetween. The LCD panel is not limited thereto. The LCD devices may be provided with an LCD panel using a drive technology of a horizontal electric field mode, such as fringe field switching (FFS) mode and in-plane switching (IPS) mode. The LCD devices may be provided with a cholesteric liquid crystal or a polymer dispersive liquid crystal (PDLC) as the LCD panel. In this case, the LCD devices include no polarizing plate.

While the explanation has been made of the LCD devices provided with an LCD panel in the embodiments, the present disclosure is applicable to a reflective display device that includes an LCF and a color filter and controls display by a component other than an LCD panel. The member that reflects light is not limited to a reflective electrode and simply needs to be a member that reflects light.

2. Electronic Apparatuses

The display device including the reflective LCD device 1 and the transflective LCD device 1a according to the present disclosure is applicable to display units (display devices) of any types of electronic apparatuses that display a video signal received by the electronic apparatuses or a video signal generated in the electronic apparatuses as an image or video.

The display device according to the present disclosure is preferably applied to display units (display devices) of portable electronic apparatuses frequently used outdoors among all types of electronic apparatuses. Examples of the portable electronic apparatuses include, but are not limited to, portable information apparatuses, such as digital cameras, video cameras, personal digital assistants (PDA), game machines, notebook personal computers, and electronic books, portable communication apparatuses, such as mobile phones, etc.

The following describes electronic apparatuses provided with the display device according to the present disclosure as a display unit, that is, specific examples of an electronic apparatus according to the present disclosure.

Figure 24A:
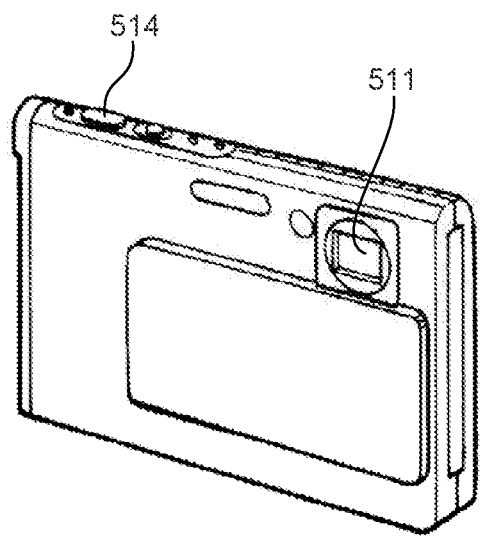
FIG. 24A is a perspective view of an appearance of a digital camera to which the present disclosure is applied.
Figure 24B:
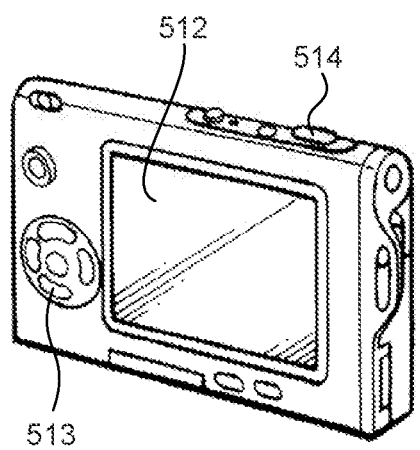
FIG. 24B is another perspective view of the appearance of the digital camera to which the present disclosure is applied.

FIG. 24A is a perspective view of an appearance of a digital camera to which the present disclosure is applied viewed from the front side. FIG. 24B is a perspective view of the appearance of the digital camera viewed from the rear side. The digital camera according to the present application example includes a light-emitting unit 511 that outputs flashlight, a display unit 512, a menu switch 513, and a shutter button 514. The digital camera is manufactured by applying the LCD device 1 or 1a according to the present disclosure to the display unit 512.

Figure 25:
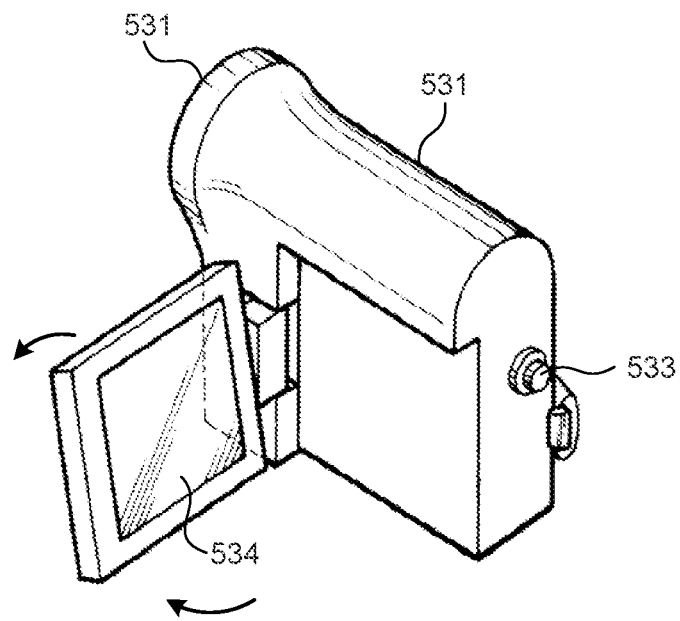
FIG. 25 is a perspective view of an appearance of a video camera to which the present disclosure is applied.

FIG. 25 is a perspective view of an appearance of a video camera to which the present disclosure is applied. The video camera according to the present application example includes a main body 531, a lens 532 arranged on the side surface facing the front to photograph a subject, a start/stop switch 533 used in photographing, and a display unit 534. The video camera is manufactured by applying the LCD device 1 or 1a according to the present disclosure to the display unit 534.

Figure 26:
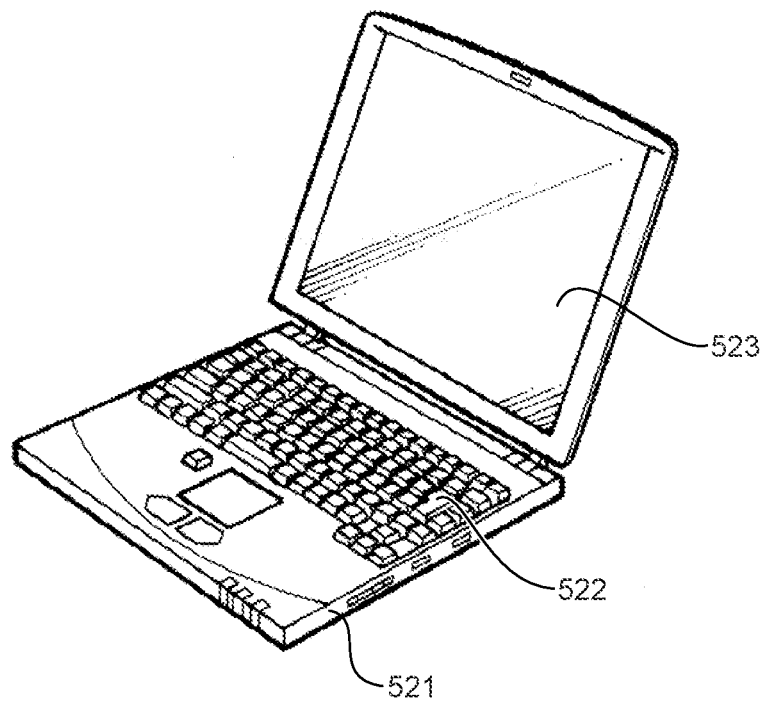
FIG. 26 is a perspective view of an appearance of a notebook personal computer to which the present disclosure is applied.

FIG. 26 is a perspective view of an appearance of a notebook personal computer to which the present disclosure is applied. The notebook personal computer according to the present application example includes a main body 521, a keyboard 522 operated when inputting characters and the like, and a display unit 523 that displays an image. The notebook personal computer is manufactured by applying the LCD device 1 or 1a according to the present disclosure to the display unit 523.

Figure 27A:
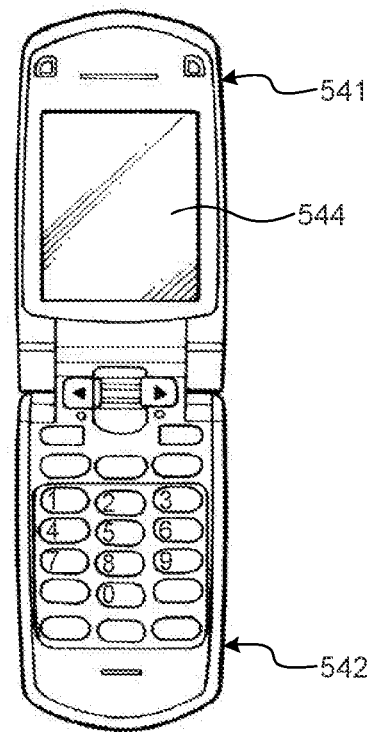
FIG. 27A is a front view of a mobile phone to which the present disclosure is applied in an unfolded state.
Figure 27B:
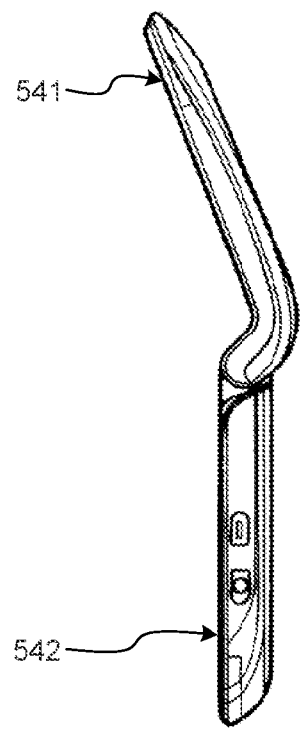
FIG. 27B is a side view of the mobile phone to which the present disclosure is applied.
Figure 27C:
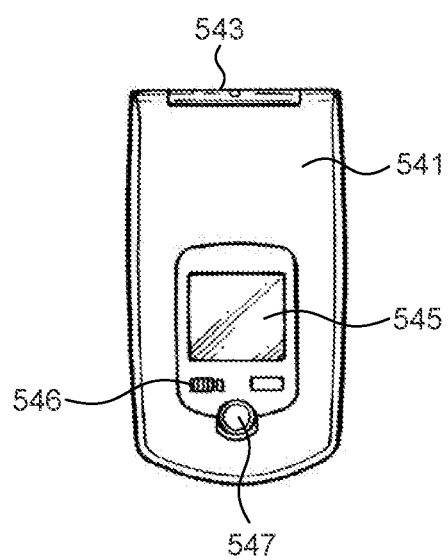
FIG. 27C is a front view of the mobile phone to which the present disclosure is applied in a folded state.
Figure 27D:
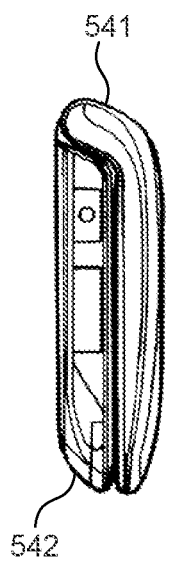
FIG. 27D is a left side view of the mobile phone to which the present disclosure is applied.
Figure 27E:
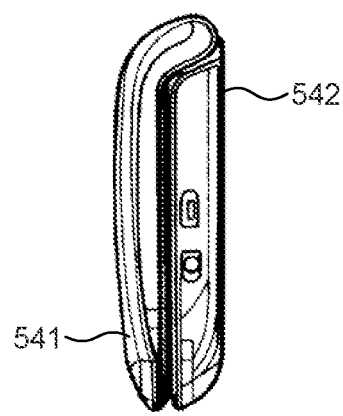
FIG. 27E is a right side view of the mobile phone to which the present disclosure is applied.
Figure 27F:
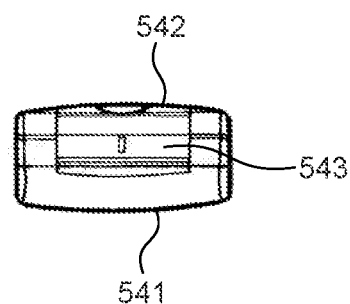
FIG. 27F is a top view of the mobile phone to which the present disclosure is applied.
Figure 27G:
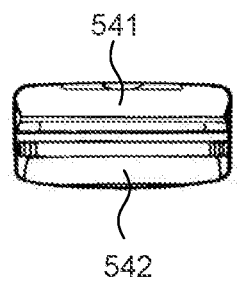
FIG. 27G is a bottom view of the mobile phone to which the present disclosure is applied.

FIG. 27A to FIG. 27G are views of an appearance of a portable communication apparatus, such as a mobile phone, to which the present disclosure is applied. FIG. 27A is a front view of the mobile phone in an unfolded state, and FIG. 27B is a side view. FIG. 27C is a front view of the mobile phone in a folded state, FIG. 27D is a left side view, FIG. 27E is a right side view, FIG. 27F is a top view, and FIG. 27G is a bottom view.

The mobile phone according to the present application example includes an upper housing 541, a lower housing 542, a connection (a hinge in this example) 543, a display 544, a sub-display 545, a picture light 546, and a camera 547. The mobile phone according to the present application example is manufactured by applying the LCD device 1 or 1a according to the present disclosure to the display 544 and/or the sub-display 545.

Figure 28:
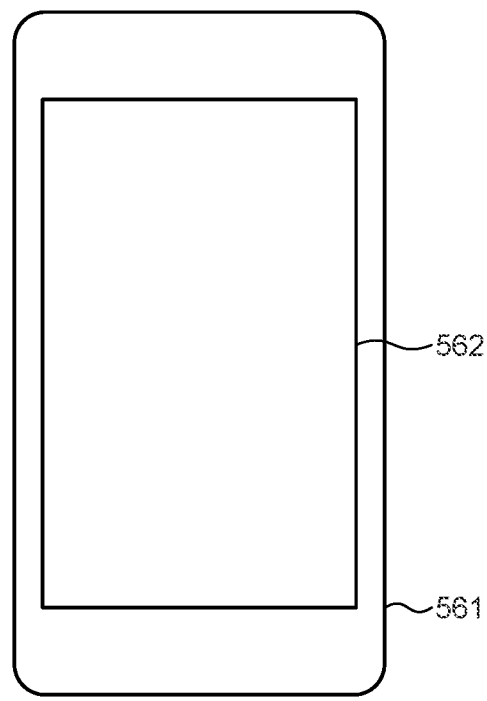
FIG. 28 is a front view of another portable electronic apparatus to which the present disclosure is applied.

FIG. 28 is a front view of another portable electronic apparatus to which the present disclosure is applied. A portable electronic apparatus according to the present application example operates as a mobile computer, a multifunctional mobile phone, a mobile computer capable of making a voice call, or a mobile computer capable of performing communications. The portable electronic apparatus is a portable information terminal, which may be called a smartphone or a tablet terminal. The portable information terminal includes a display unit 562 on the surface of a housing 561, for example. The display unit 562 corresponds to the LCD devices 1 and 1a according to the embodiments. The display unit 562 is provided with what is called a touch panel that detects an object in the vicinity of the LCD panel.

3. Aspects of the Present Disclosure

The present disclosure includes aspects as follows.

(1) A display device comprising:
a display surface on which pixels each including sub-pixels of a plurality of colors are two-dimensionally arrayed;
a reflective member;
a first substrate provided with the reflective member;
a second substrate arranged to face the first substrate;
a color filter provided with filters of at least two colors corresponding to the sub-pixels; and
a scattering member provided on the second substrate, wherein
a main viewing angle direction of the display device is a direction intersecting with the display surface, and
the color filter is formed such that a change in transmittance of the filters per pixel in the main viewing angle direction is smaller than a change in transmittance of the filters per pixel in a direction orthogonal to the main viewing angle direction in a direction parallel to the display surface.

(2) The display device according to (1), further comprising:
a transparent electrode; and
a liquid-crystal layer provided between the first substrate and the second substrate, wherein
the reflective member is a reflective electrode that forms an electric field between the transparent electrode and the reflective electrode.

(3) The display device according to (1), wherein the color filter is formed such that a direction in which the transmittance of the filters per pixel varies least coincides with the main viewing angle direction in the direction parallel to the display surface.

(4) The display device according to (1), wherein
the scattering member is an anisotropic scattering member that has a scattering central axis and scatters light passing therethrough along a scattering axis direction serving as a direction having a predetermined angular range containing the scattering central axis, and
the scattering axis direction is the same direction as the main viewing angle direction.

(5) The display device according to (4), wherein
the scattering member includes the anisotropic scattering member provided in plurality, and
the scattering axis direction of each anisotropic scattering member is the same direction.

(6) The display device according to (1), wherein
each of the pixels is formed such that the sub-pixels thereof are aligned in a direction orthogonal to the main viewing angle direction, and
the color filter is formed such that the filters of the same color are aligned in the main viewing angle direction and the filters of different colors are aligned in a direction orthogonal to the main viewing angle direction.

(7) The display device according to (1), wherein the color filter includes the filters of red, green, and blue for each of the pixels.

(8) The display device according to (1), wherein
the pixels each include four or more of the sub-pixels, and
the color filter includes the filters of four or more colors.

(9) The display device according to (1), wherein the color filter is formed the first substrate at a position closer to the liquid-crystal layer than the reflective member.

(10) The display device according to (1), further comprising:
an illuminating unit that is mounted on the second substrate and outputs light toward the first substrate, wherein
the illuminating unit includes a light guide plate facing the first substrate and a light source that outputs light from a side of the light guide plate, and
a traveling direction of the light that is output from the light source and travels in the light guide plate is the same direction as the scattering axis direction when viewed from a direction in which the first substrate and the light guide plate face each other.

(11) The display device according to (1), wherein
the color filter is provided with a light blocking portion between the filters in an area of each of the pixels, and
the liquid-crystal layer includes a spacer at a position overlapping with the light blocking portion when viewed from a direction orthogonal to the display surface.

(12) The display device according to (11), wherein the light blocking portion is arranged between the filters whose difference in the transmittance is largest in the area of each of the pixels.

(13) An electronic apparatus comprising the display device according to (1).

In the display device having the configuration described above and the electronic apparatus including the display device, the color filter is arranged such that a change in the transmittance of the filters per pixel in the main viewing angle direction is smaller than a change in the transmittance of the filters per pixel in a direction orthogonal to the main viewing angle direction in the direction parallel to the display surface. This can suppress a large change in the transmittance of the color filter in the main viewing angle direction in which a blur in an image is likely to occur and occurrence of a blur at a portion in which the transmittance changes. As a result, it is possible to reduce a blur in an image and display a higher quality image.

The present disclosure arranges the filters corresponding to respective sub-pixels of the color filter in a manner having low transmittance in the main viewing angle direction in one pixel. The present disclosure can reduce a blur in an image and display a higher quality image.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a display surface on which pixels each including four sub-pixels of four colors, the four sub-pixels being arrayed in a matrix of a first viewing angle direction and a second viewing angle direction orthogonal to the first viewing angle direction, wherein the first viewing angle direction is a component in a direction parallel to the display surface of a main viewing angle direction that intersects with the display surface;
a reflective member;
a first substrate provided with the reflective member;
a second substrate arranged to face the first substrate;
a color filter provided with filters of four colors corresponding to the four sub-pixels, the filters including a red filter, a green filter, a blue filter, and a white filter; and
a scattering member provided on the second substrate, wherein
the color filter is formed such that a change in transmittance of the filters per pixel in the main viewing angle direction is smaller than a change in transmittance of the filters per pixel in a direction orthogonal to the first viewing angle direction in the second viewing angle direction parallel to the display surface,
wherein the pixels are arranged in a matrix on the display surface,
wherein, in each of the pixels,
in the first viewing angle direction, the red filter is adjacent to the blue filter, and the white filter is adjacent to the green filter; and
in the second viewing angle direction, the red filter is adjacent to the white filter, and the blue filter is adjacent to the green filter, and
wherein the four sub-pixels are equal in size.

2. The display device according to claim 1, wherein
the scattering member is an anisotropic scattering member that has a scattering central axis and scatters light passing therethrough along a scattering axis direction serving as a direction having a predetermined angular range containing the scattering central axis, and
the scattering axis direction is the same direction as the first viewing angle direction.

3. The display device according to claim 2, wherein
the scattering member includes the anisotropic scattering member provided in plurality, and
the scattering axis direction of each anisotropic scattering member is the same direction.

4. The display device according to claim 1, wherein
the color filter is provided with a light blocking portion between the filters in an area of each of the pixels, and
a liquid-crystal layer includes a spacer at a position overlapping with the light blocking portion when viewed from a direction orthogonal to the display surface.

5. The display device according to claim 4, wherein the light blocking portion is arranged between the filters whose difference in the transmittance is largest in the area of each of the pixels.

6. An electronic apparatus comprising the display device according to claim 1.

* * * * *